US006952811B1

(12) United States Patent
Iwata et al.

(10) Patent No.: US 6,952,811 B1
(45) Date of Patent: Oct. 4, 2005

(54) LADDER CIRCUIT EDITING SYSTEM

(75) Inventors: Yasunobu Iwata, Tokyo (JP); Taku Watanabe, Tokyo (JP); Shigeki Yamada, Aichi (JP); Hiroyasu Kimura, Aichi (JP); Teruyuki Harada, Aichi (JP); Tomoko Nakamura, Aichi (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 283 days.

(21) Appl. No.: 09/722,306

(22) Filed: Nov. 28, 2000

Related U.S. Application Data

(63) Continuation of application No. PCT/JP98/03402, filed on Jul. 30, 1998.

(51) Int. Cl.[7] ........................ G06F 17/50; G05B 11/01; G09G 5/00

(52) U.S. Cl. ............................. 716/4; 716/11; 700/18; 345/168

(58) Field of Search ........................... 716/1, 11, 17, 4; 717/151; 714/52; 712/203, 202; 710/5, 45; 700/83, 22, 180, 18, 82; 345/157, 168; 318/568.11; 219/486

(56) References Cited

U.S. PATENT DOCUMENTS

| | | | | |
|---|---|---|---|---|
| 4,432,047 | A * | 2/1984 | Okayama | 700/18 |
| 5,126,956 | A * | 6/1992 | Komiya et al. | 700/180 |
| 5,177,420 | A * | 1/1993 | Wada et al. | 318/568.11 |
| 5,220,512 | A * | 6/1993 | Watkins et al. | 716/11 |
| 5,497,315 | A * | 3/1996 | Sugiura et al. | 700/20 |
| 5,586,335 | A * | 12/1996 | Utan | 700/18 |
| 5,699,080 | A * | 12/1997 | Oshiga et al. | 345/157 |

FOREIGN PATENT DOCUMENTS

| | | | | |
|---|---|---|---|---|
| EP | 551098 A1 * | 7/1993 | | G05B 19/05 |
| JP | 62-202202 | 9/1987 | | |
| JP | 2-5102 | 1/1990 | | |
| JP | 02-220102 | 9/1990 | | |
| JP | 4-286002 | 10/1992 | | |
| JP | 08006610 A * | 6/1994 | | G05B 19/02 |
| JP | 07-146642 | 6/1995 | | |
| JP | 8-272411 | 10/1996 | | |
| JP | 02002073120 A * | 3/2002 | | G05B 19/05 |

* cited by examiner

*Primary Examiner*—A. M. Thompson
*Assistant Examiner*—Helen Rossoshek
(74) *Attorney, Agent, or Firm*—Sughrue Mion, PLLC

(57) ABSTRACT

A ladder circuit editing system inputs and edits a sequence program for a program controller in the form of a ladder diagram. The ladder circuit editing system has an unavailable area storing at least one inputted circuit pattern and an available area storing a new circuit pattern, and successively inputs circuit patterns from the available area. The ladder circuit editing system includes a circuit pattern extracting means, a display means, and a copying means. The circuit pattern extracting means compares a circuit element from a circuit pattern stored in the available area with a circuit element from a circuit pattern already stored in the unavailable area, and extracts a circuit pattern containing a circuit element that agrees with a stored one. The display means displays the extracted circuit pattern on an input screen. The copying means copies the extracted circuit pattern into the available area according to an operator's entry.

11 Claims, 28 Drawing Sheets

CHARACTER MEMORY 0301

| ROW \ COLUMN | 1 | 2 | 3 | 4 | 5 | 6 | 7 | 8 |
|---|---|---|---|---|---|---|---|---|
| 1 | X0 | M100 | | | | | | Y0 |
| 2 | X20 | | | | | | | |

FIG. 4
STRUCTURE OF EACH LOCATION IN CHARACTER MEMORY
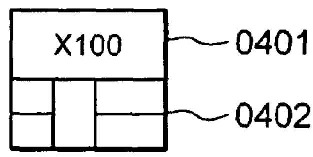
FIG. 5
STRUCTURE OF SYMBOL AREA 402
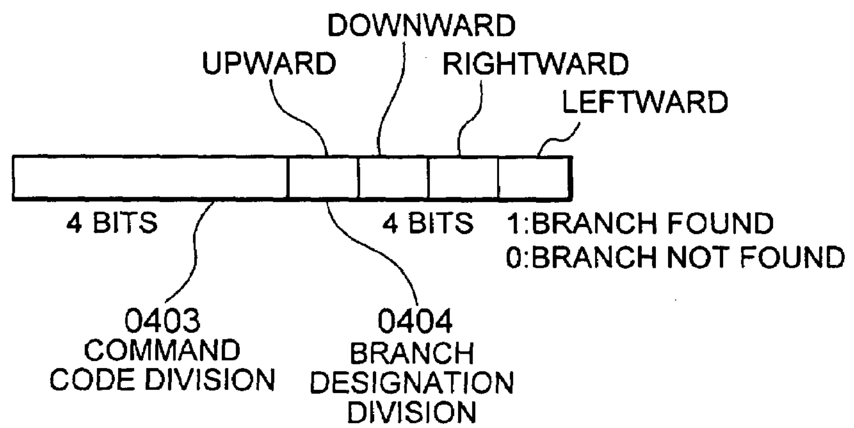
FIG. 6
CODE TABLE 0405 RELEVANT TO COMMAND CODE DIVISION
| COMMAND | COMMAND CODE |
|---|---|
| | 0 |
| | 1 |
| | 2 |
| CONNECTION | 3 |

LADDER DIAGRAM 0501

CHARACTER MEMORY 0601

| ROW \ COLUMN | 1 | 2 | 3 | 4 | 5 | 6 | 7 | 8 |
|---|---|---|---|---|---|---|---|---|
| 1 | X0 | | | | | | | Y0 |
| 2 | X1 | | | | | | | |
| 3 | X1 | M100 | | | | | | Y12 |
| 4 | | | | | | | | Y13 |

LADDER DIAGRAM 0701

CHARACTER MEMORY

| ROW \ COLUMN | 1 | 2 | 3 | 4 | 5 | 6 | 7 | 8 |
|---|---|---|---|---|---|---|---|---|
| 1 | X0 | | | | | | | Y0 |
| 2 | X1 | | | | | | | |
| 3 | X2 | M100 | | | | | | Y12 |
| 4 | | | | | | | | Y13 |
| 5 | X10 | | | | | | | Y20 |
| 6 | | | | | | | | |

0801 (rows 1–4)

0802 (rows 5–6)

FIG. 22

CHARACTER MEMORY 1311

| ROW \ COLUMN | 1 | 2 | 3 | 4 | 5 | 6 | 7 | 8 |
|---|---|---|---|---|---|---|---|---|
| 1 | X0 | | | | | | | Y0 |
| 2 | X1 | | | | | | | |
| 3 | X2 | M100 | | | | | | Y12 |
| 4 | | | | | | | | Y13 |
| 5 | | | | | | | | |
| 6 | | | | | | | | |

LADDER DIAGRAM 1401

FIG. 24

CHARACTER MEMORY 1501

| ROW \ COLUMN | 1 | 2 | 3 | 4 | 5 | 6 | 7 | 8 |
|---|---|---|---|---|---|---|---|---|
| 1 | X0 | | | | | | | Y0 |
| 2 | X1 | | | | | | | |
| 3 | X2 | M100 | | | | | | Y12 |
| 4 | | | | | | | | Y13 |
| 5 | X3 | | | | | | | Y14 |
| 6 | X4 | | | | | | | Y15 |

FIG. 26

CHARACTER MEMORY

| ROW \ COLUMN | 1 | 2 | 3 | 4 | 5 | 6 | 7 | 8 |
|---|---|---|---|---|---|---|---|---|
| 1 | X0 | | | | | | | Y0 |
| 2 | X1 | | | | | | | |
| 3 | X2 | M100 | | | | | | Y12 |
| 4 | | | | | | | | Y13 |
| 5 | X3 | | | | | | | Y14 |
| 6 | X4 | | | | | | | Y15 |
| 7 | X3 | | | | | | | |
| 8 | X4 | | | | | | | |

1701 (rows 1–7)

1702 (rows 7–8)

FIG. 27

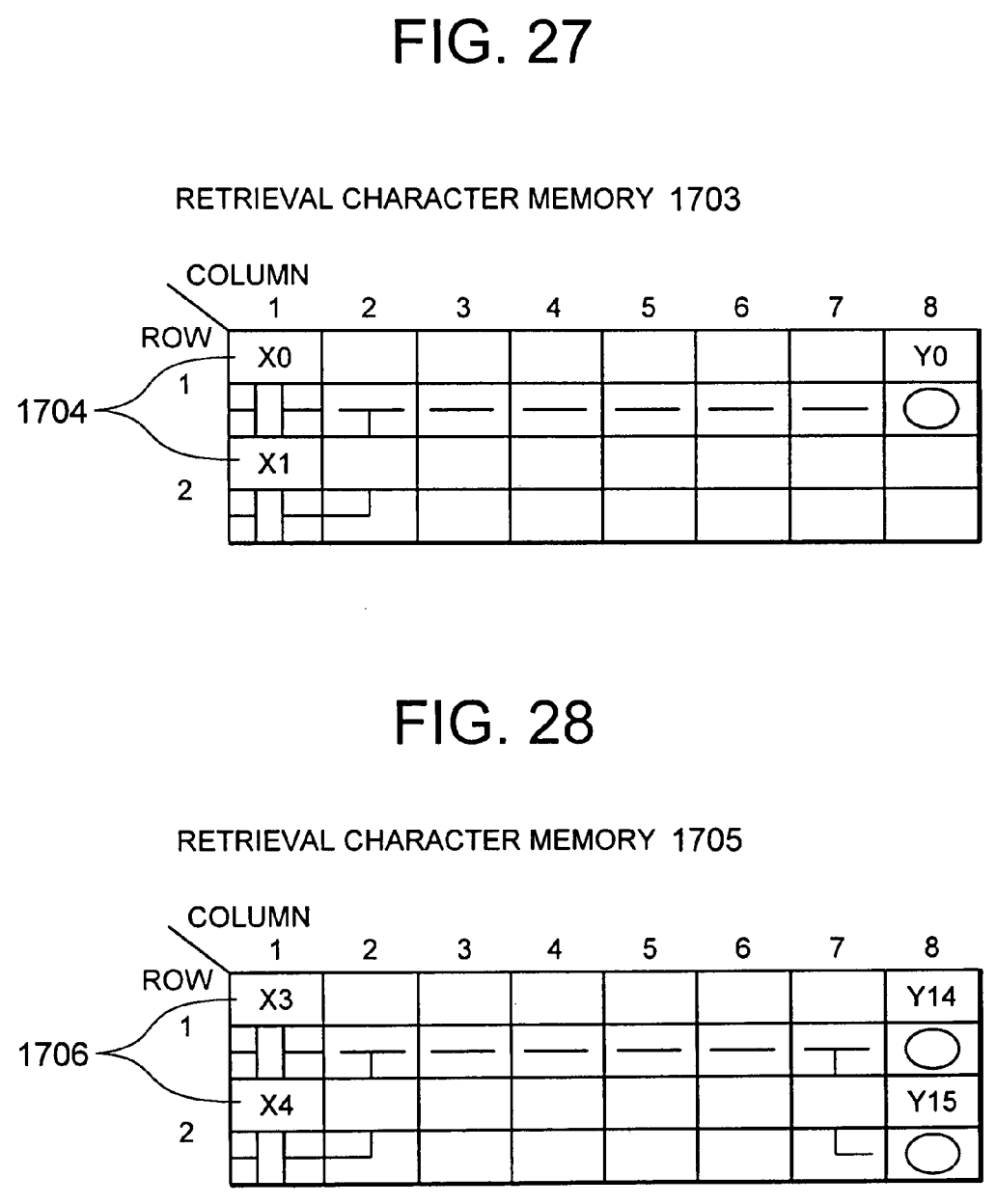

RETRIEVAL CHARACTER MEMORY 1703

| ROW \ COLUMN | 1 | 2 | 3 | 4 | 5 | 6 | 7 | 8 |
|---|---|---|---|---|---|---|---|---|
| 1 | X0 | | | | | | | Y0 |
| 2 | X1 | | | | | | | |

RETRIEVAL CHARACTER MEMORY 1705

| ROW \ COLUMN | 1 | 2 | 3 | 4 | 5 | 6 | 7 | 8 |
|---|---|---|---|---|---|---|---|---|
| 1 | X3 | | | | | | | Y14 |
| 2 | X4 | | | | | | | Y15 |

1706

FIG. 33
COLUMN
ROW
1 2 3 4 5 6 7 8
X1 X2 Y2
Y12
2107
FIG. 34
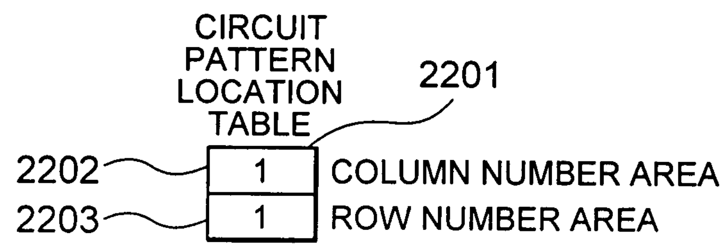
FIG. 35
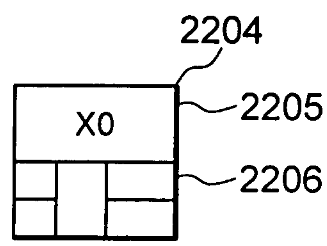

LADDER CIRCUIT EDITING SYSTEM

CROSS REFERENCE TO RELATED APPLICATION

This is a continuation of International Application PCT/JP98/03402, with an international filing date of Jul. 30, 1998, the contents of which is hereby incorporated by reference into the present application.

TECHNICAL FIELD

The present invention relates to a programmable controller for controlling mechanical facilities, or more particularly, to a ladder circuit editing system for programming a ladder circuit (ladder diagram) for the programmable controller.

BACKGROUND ART

FIG. 7 shows an example of a typical sequence program described in the form of a ladder diagram. For controlling mechanical facilities according to a sequence of events, a programmable controller has been employed in the past. A generally adopted method of programming the programmable controller employs a ladder diagram shown in FIG. 7.

Many portions of the ladder diagram often express similar circuits resulting from repetition of a circuit. The similar circuits are different from one another in terms of variables such as contacts or coils. Japanese Unexamined Patent Application Publication No. 4-286002 has disclosed a system for configuring and editing a sequence program consisting of descriptions of similar circuits resulting from repetition of a circuit that is regarded as a repetitive circuit and that has variables thereof alone varied regularly. Some systems including the disclosed system have a copying facility. When a basic unit circuit pattern and a rule on regular variation of a variable are designated, the copying facility autonomously repeats copying of the basic unit, and autonomously varies the variable according to the rule. The repetitive circuit is thus automatically repeated, and the results of automatic production are expressed in the form of a ladder diagram.

Furthermore, Japanese Unexamined Patent Application Publication No. 2-5102 has disclosed a system having the ability to store basic unit circuit patterns and rules on regular variation of variables in the form of a library in a memory or an external storage device, and to select and read a specific circuit pattern from the library in the memory or external storage device if necessary. A ladder diagram is thus automatically produced.

However, according to the foregoing related arts, an operator must intentionally extract or store a basic unit circuit pattern. This is inconvenient. Moreover, when a basic unit circuit pattern registered in advance is used to edit a sequence program, an operator must select the intended basic unit circuit pattern from numerous basic unit circuit patterns stored in the form of a library. As the number of registered basic unit circuit patterns increases, it gets uneasy to judge which of the registered circuit patterns represents a circuit for performing what processing. Moreover, a predetermined auxiliary storage device allocated to a programming system must be entirely searched for the intended basic unit circuit pattern. This is inconvenient for an operator.

Furthermore, even if a plurality of basic unit circuit patterns is registered in advance, the registered patterns are not always employed. The plurality of basic unit circuit patterns compresses the storage capacity of the auxiliary storage device, and some circuit patterns may remain unused. This makes it hard to improve efficiency in program design.

The present invention attempts to solve the foregoing problems. An object of the present invention is to provide a ladder circuit editing system capable of autonomously retrieving analogous ladder diagrams without bothering an operator with extra work, and improving efficiency in designing a ladder diagram without wasting the storage capacity of an auxiliary storage device.

DISCLOSURE OF INVENTION

A ladder circuit editing system in accordance with the present invention inputs and edits a sequence program for a program controller in the form of a ladder diagram, has an unavailable area and an available area, and successively inputs circuit patterns stored in the available area. At least one circuit pattern that has been input is stored in the unavailable area, and a new circuit pattern is entered in the available area. The ladder circuit editing system comprises a circuit pattern extracting means, a display means, and a copying means. The circuit pattern extracting means compares a circuit element contained in a circuit pattern being stored in the available area with a circuit element contained in a circuit pattern already stored in the unavailable area, and extracts a circuit pattern containing a circuit element that agrees with a stored one. The display means displays the circuit pattern extracted by the circuit pattern extracting means on an input screen. The copying means copies the circuit pattern extracted by the circuit pattern extracting means into the available area according to an operator's entry.

Moreover, the display means successively displays a plurality of circuit patterns extracted by the circuit pattern extracting means. The copying means copies any circuit pattern selected based on an operator's entry from among the plurality of successively displayed circuit patterns into the available area.

Moreover, the display means displays a previously selected circuit pattern as a top priority.

The ladder circuit editing system further includes a selected circuit pattern address storage area and a replacing means. The address of a previously selected circuit pattern is stored in the selected circuit pattern address storage area. The replacing means places the address of a selected circuit pattern at the head of the selected circuit pattern address storage area. The display means displays as a top priority a previously selected circuit pattern according to the order of addresses stored in the selected circuit pattern address storage area.

BRIEF DESCRIPTION OF THE DRAWINGS

FIG. 4 shows the structure of each location in the character memory;

FIG. 5 shows the internal data structure of a symbol area;

FIG. 6 shows an example of a code specified in a command code division;

FIG. 22 shows how the ladder diagram shown in FIG. 21 is stored in the character memory;

FIG. 24 shows the character memory in which a ladder diagram is stored;

FIG. 26 shows the structure of a memory defined in a memory in which a ladder diagram is stored, that is, a character memory;

FIG. 27 shows the structure of a character memory in which a ladder diagram to be compared with a stored one is temporarily saved;

FIG. 28 shows the structure of a character memory in which a ladder diagram to be compared with a stored one is temporarily saved;

FIG. 33 shows a circuit pattern storage area;

FIG. 34 shows a circuit pattern position table;

FIG. 35 shows a circuit pattern position character memory table;

BEST MODE FOR CARRYING OUT THE INVENTION

Examples of the present invention will be described with reference to the drawings below.

EXAMPLE 1

Figure 1:
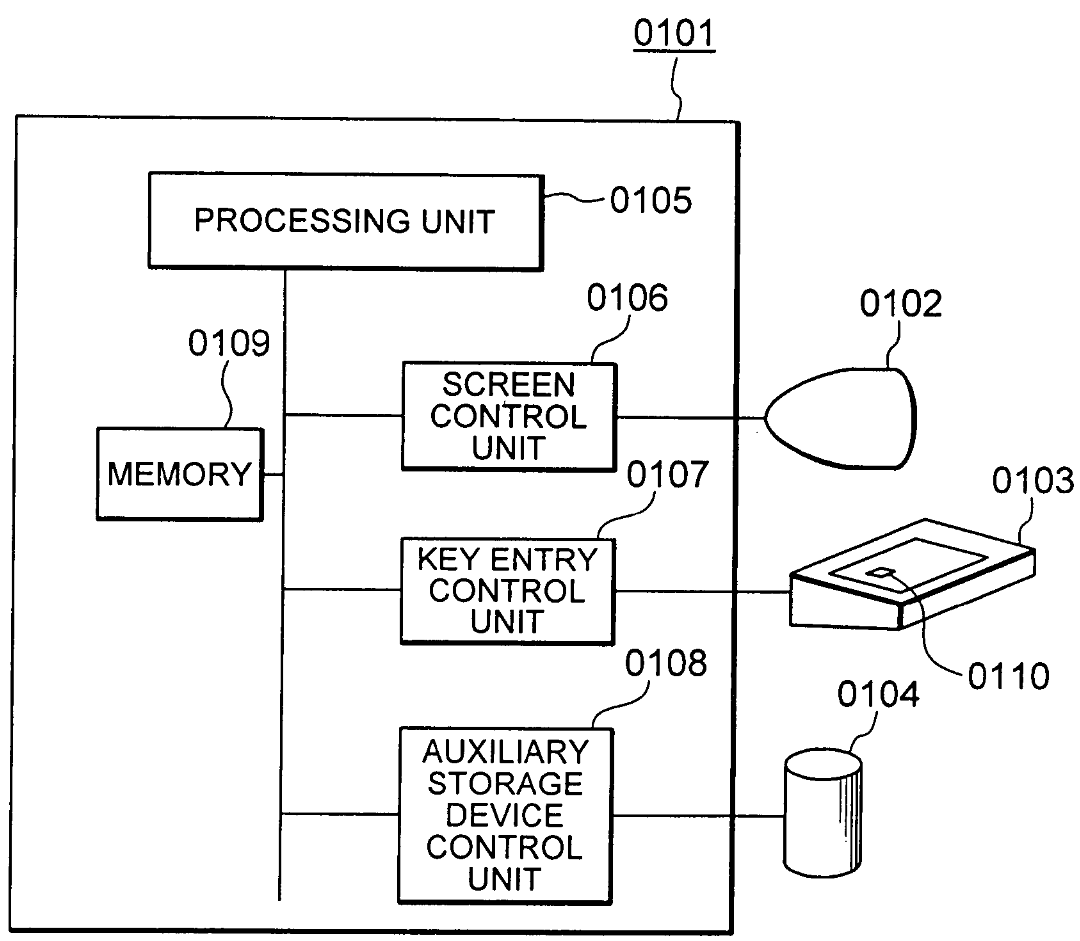
FIG. 1 is a block diagram showing equipment constituting a ladder circuit editing system in accordance with the present invention.

FIG. 1 is a block diagram showing equipment constituting a ladder circuit editing system in accordance with the present invention. In FIG. 1, reference numeral 0101 denotes a ladder circuit editing system, 0102 denotes a CRT, 0103 denotes a keyboard, and 0104 denotes an auxiliary storage device. Reference numeral 0105 denotes a processing unit, 0106 denotes a screen control unit, 0107 denotes a key entry control unit, 0108 denotes an auxiliary storage device control unit, 0109 denotes a memory, and 0110 denotes a function key.

Figures 2, 3:
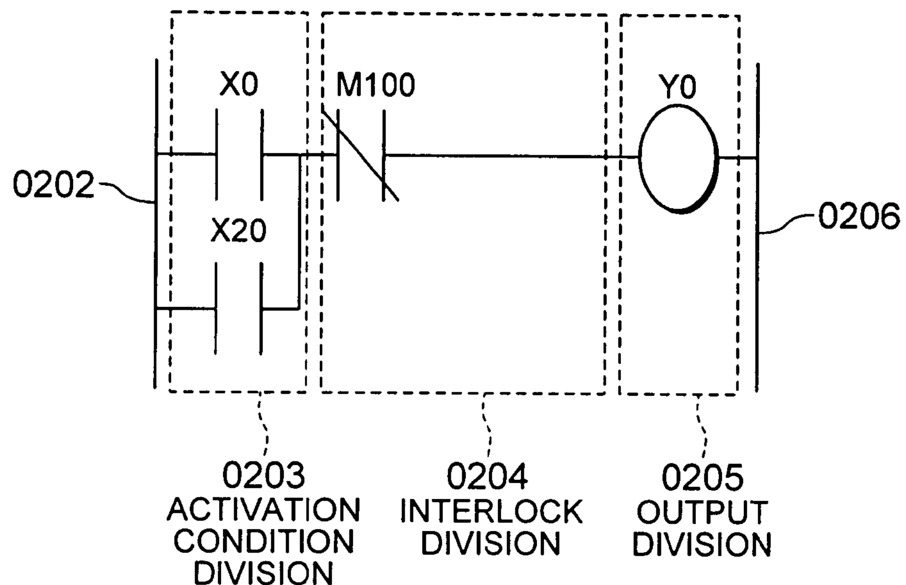
FIG. 2 shows divisions of a ladder diagram.
FIG. 3 shows the structure of a memory defined in a memory in which a ladder diagram is held, that is, a character memory.

FIG. 2 shows divisions of a ladder diagram. In FIG. 2, reference numeral 0201 denotes a ladder diagram. The details of the ladder diagram will be described later. The ladder diagram 0201 has a left generatrix 0202, an activation condition division 0203, an interlock division 0204, an output division 0205, and a right generatrix 0206.

FIG. 3 shows the structure of a memory (hereinafter referred to as a character memory) defined in a memory 0109 in which a ladder diagram 0201 is stored. Referring to FIG. 3, reference numeral 0301 denotes a character memory defined at a predetermined location in the memory 0109.

FIG. 4 shows the structure of each location in the character memory 1. Referring to FIG. 4, reference numeral 0401 denotes a device number area and 0402 denotes a symbol area.

FIG. 5 shows the internal data structure of the symbol area 0402. Referring to FIG. 5, reference numeral 0403 denotes a command code division and 0404 denotes a branch designation division.

FIG. 6 shows an example of a code to be specified in the command code division 0403.

Figures 7, 8:
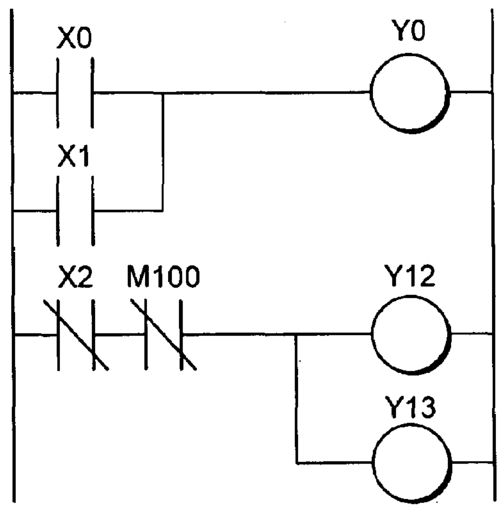
FIG. 7 shows an example of a typical sequence program expressed in the form of a ladder diagram.
FIG. 8 shows the structure of a memory defined in a memory in which a ladder diagram is held, that is, a character memory.

FIG. 7 shows an example of a ladder diagram. Referring to FIG. 7, reference numeral 0501 denotes a ladder diagram.

FIG. 8 shows the structure of a character memory defined in the memory 0109 in which a ladder diagram 0501 is stored. Referring to FIG. 8, reference numeral 0601 denotes a character memory defined at a predetermined location in the memory 0109.

Figure 9:
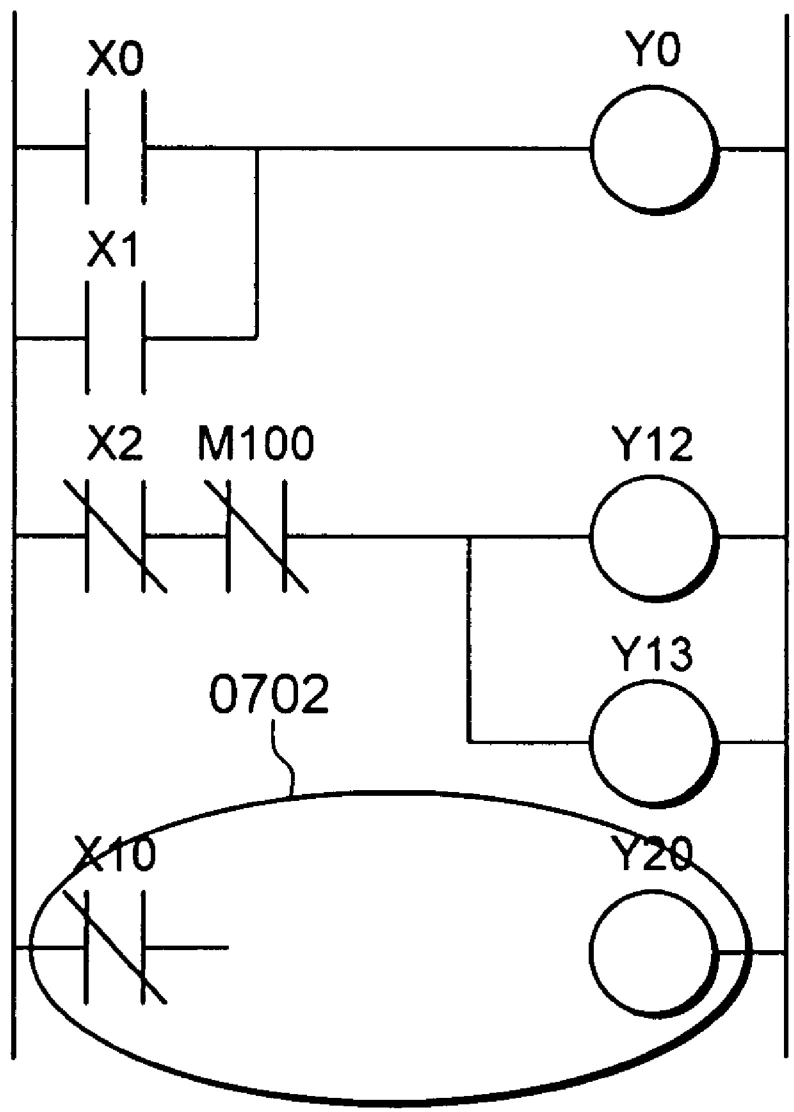
FIG. 9 shows the ladder diagram, which is shown in FIG. 7, having part of additional circuit elements added thereto.

FIG. 9 shows the ladder diagram, which is shown in FIG. 7, having part of additional circuit elements added thereto. Referring to FIG. 9, reference numeral 0701 denotes a ladder diagram and 0702 denotes an additional circuit block.

Figures 10, 11:
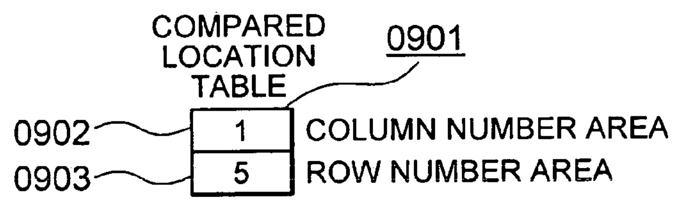
FIG. 10 shows the structure of a memory defined in a memory in which a ladder diagram is held, that is, a character memory.
FIG. 11 shows a compared location table defined in a memory when the system carries out retrieval.

FIG. 10 shows the structure of a memory defined in the memory 0109 in which a ladder diagram 0701 is stored, that is, a character memory. Referring to FIG. 10, reference numerals 0801 and 0802 denote character memories defined at predetermined locations in the memory 0109. The character memory 0801 serves as an unavailable area in which at least one circuit patterns has been input is stored. The character memory 0802 is a character memory allocated to the additional circuit block 0702 and serves as an available area in which a new circuit pattern is stored.

FIG. 11 shows a compared to look a table to be defined in the memory 0109 when the system performs retrieval. Referring to FIG. 11, reference numeral 0901 denotes a compared location table indicating a location in the character memory 0801 whose data is being edited. 0902 denotes a column number area in the compared location table 0901, and 0903 denotes a row number area in the compared location table 0901.

Figure 12:
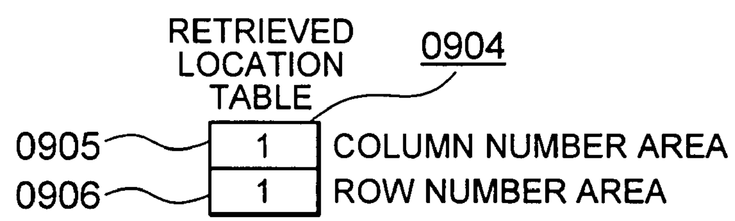
FIG. 12 shows a compared location table defined in a memory when the system carries out retrieval.

FIG. 12 shows a compared location table to be defined in the memory 0109 when the system performed retrieval. Referring to FIG. 12, reference numeral 0904 denotes a retrieved location table indicating a location in the character memory 0801 from which data is being retrieved. 0905 denotes a column number area in the retrieved location table 0904, and 0906 denotes a row number area in the retrieved location table 0904.

Figure 13:
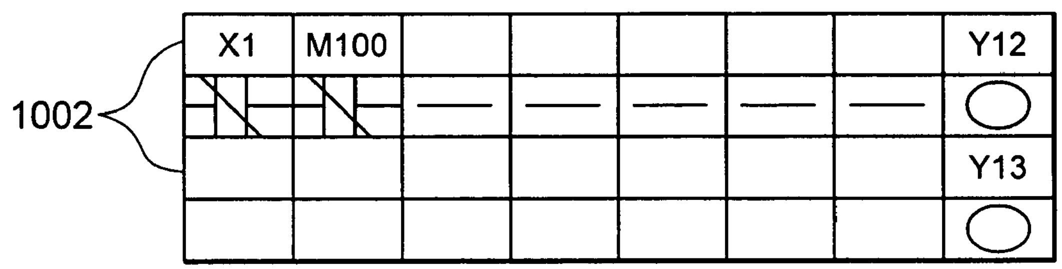
FIG. 13 shows the structure of a retrieval character memory in which circuit elements contained a ladder diagram and to be compared with stored ones are temporarily saved.

FIG. 13 shows the structure of a retrieval character memory in which circuit elements to be contained in a ladder diagram and to be compared with stored ones are temporarily saved. Referring to FIG. 13, reference numeral 1001 denotes a retrieval character memory, and 1002 denotes a device number area in the retrieval character memory 1001.

FIG. 14, FIG. 15, FIG. 16, FIG. 17, FIG. 18, and FIG. 19 are flowcharts describing processing to be performed by the processing unit 0105. FIG. 20 shows an example of a message to be displayed on a CRT when a pattern agrees with a stored one. Referring to FIG. 20, reference numeral 1301 denotes a message.

Figure 21:
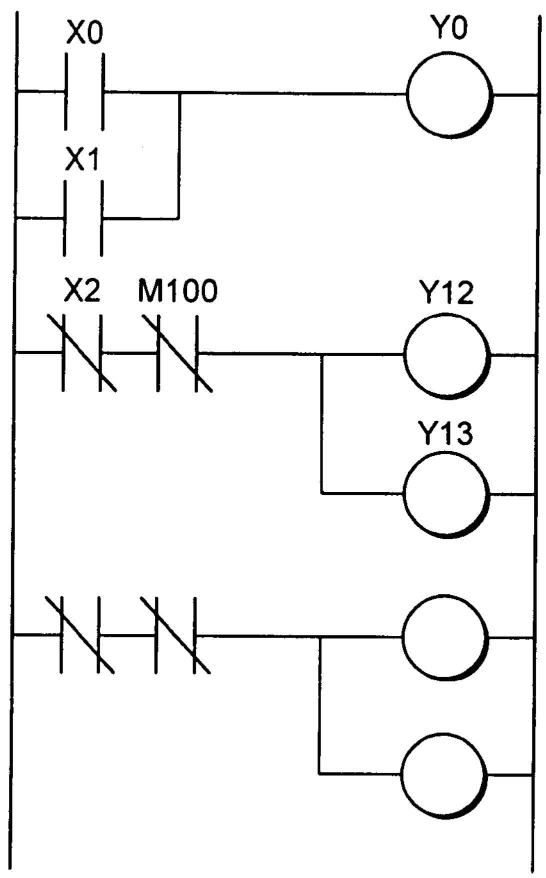
FIG. 21 shows a ladder diagram resulting from copying of data stored in a retrieval character memory into a character memory.

FIG. 21 shows a ladder diagram updated because a pattern agrees with a stored one. Referring to FIG. 21, reference numeral 1310 denotes a ladder diagram updated because a pattern agrees with a stored one.

Figure 22:
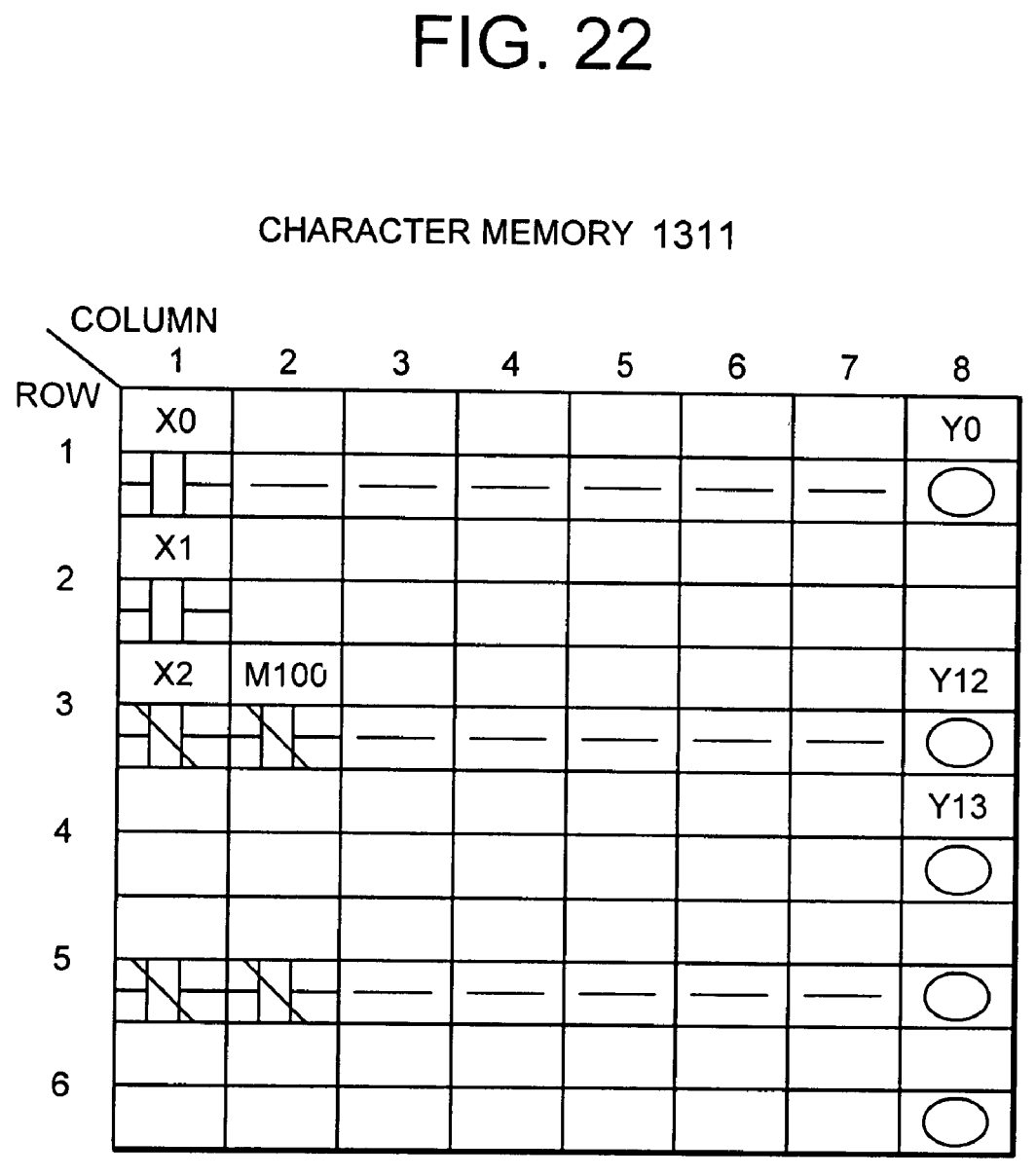

FIG. 22 shows a character memory updated because a pattern agrees with a stored one. Referring to FIG. 22, reference numeral 1311 denotes a character memory allocated to a ladder diagram 1310.

Next, actions will be described. In general, a ladder diagram has, as shown in FIG. 2, the activation condition division 0203 located by the right side of the left generatrix 0202, and has the output division 0205 located by the left side of the right generatrix 0206. Moreover, the interlock division 0204 is interposed between the activation condition division 0203 and output division 0205. The ladder diagram 0201 is thus structured.

For editing the ladder diagram, the ladder circuit editing system 0101 shown in FIG. 1 is employed. First, an entry is made using the keys of the keyboard 0103. A symbol indicating a command associated with the entry is displayed on the screen of the CRT 0102. The data of the symbol is stored in the memory 0109. The storage region in the memory 0109 is referred to as a character memory as mentioned above. The character memory has the structure shown in FIG. 3. The character memory 0301 has the same structure as an image shown on the screen. A location in the character memory 0301 can be indicated with a row number and a column number.

Each location in the character memory 0301 is, as shown in FIG. 4, composed of a symbol area 0402 in which a symbol indicating a command is specified, and a device number area 0401 in which a device number is specified. The symbol area 0402 has the internal structure shown in FIG. 5, and consists internally of a command code division 0403 and a branch designation division 0404. Data to be specified in the command code division 0403 is, for example, a value listed in the code table 0405 relevant to the command code division shown in FIG. 6.

For example, patterns specified in the activation condition division 0203 of the ladder diagram 0201 shown in FIG. 2 have relevant data stored at locations (1, 1) and (2, 1) in the character memory 0301 shown in FIG. 3. As for data at the location (1, 1), four bits specified in the command code division 0403 as shown in FIG. 5 indicate command code 0. Four bits specified in the branch designation division 0404 indicate that a branch grows downward. Consequently, the data at the location (1, 1) represents 00000100B. As for data at the location (2, 1), four bits specified in the command code division 0403 indicate command code 0, and four bits specified in the branch designation division 0404 indicate that a branch grows upwards. Consequently, the data at the position (2, 1) represents 00001000B.

Assume that the ladder diagram 0501 shown in FIG. 7 has already been input, and the character memory 0601 allocated to the ladder diagram 0501 has been, as shown in FIG. 8, defined in the memory 0109. A description will be made of addition of the additional circuit block 0702 to the ladder diagram 501 (FIG. 9). Addition of the additional circuit block 0702 changes the character memory 0601 as shown in FIG. 10. The character memory consists of, as mentioned above, the character memory 0801 serving as an unavailable area and the character memory 0802 serving as an available area.

In this state, the keyboard 0103 is used to issue a Retrieve instruction. The Retrieve instruction is issued with a press of, for example, the function key 0110 on the keyboard 0103. With the press of the function key 0110, row number 5 of the available area 0802 shown in FIG. 10 is specified in the row number area 0903 in the compared location table 0901 shown in FIG. 11. Retrieval is then started.

Figure 14:
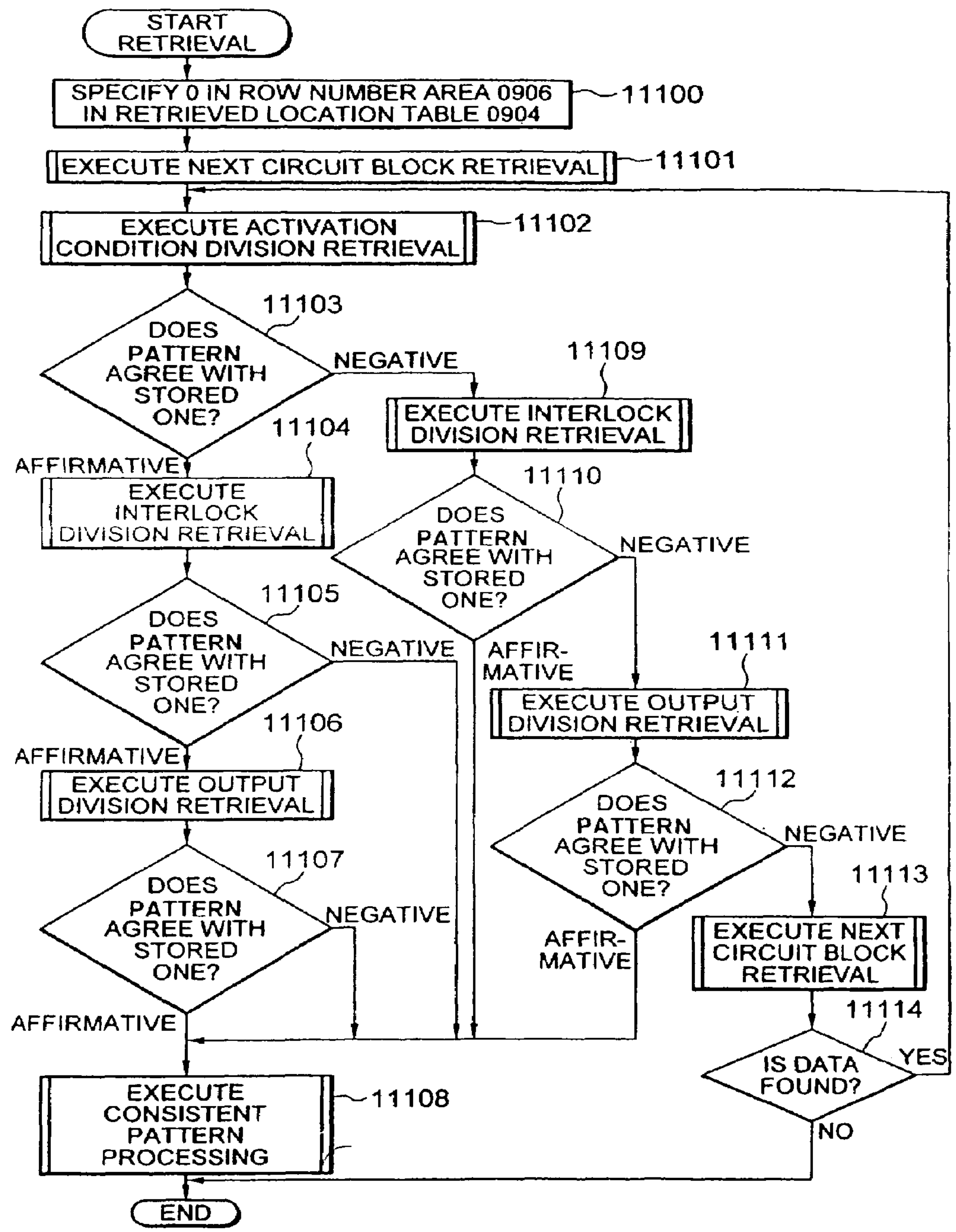
FIG. 14 is a flowchart describing a main program Retrieval.

Retrieval is carried out as described in the flowchart of FIG. 14. Broadly, first, it is checked whether a pattern specified in the activation condition division 0203 agrees with a stored one. Secondly, it is checked whether a pattern specified in the interlock division 0204 agrees with a stored one. Finally, it is checked whether a pattern specified in the output division 0205 agrees with a stored one. The main routine Retrieval will be described in conjunction with the flowchart of FIG. 14. When Retrieval is started, first, 0 is specified in the row number area 0906 in the retrieved location table 0904 at step 11100. Next Circuit Block Retrieval is executed at step 11101. The subroutine Next Circuit Block Retrieval will be detailed later. Activation Condition Division Retrieval is executed at step 11102. The subroutine Activation Condition Division Retrieval will be detailed later.

It is judged at step 11103 whether a pattern agrees with a stored one. If the pattern agrees with the stored one, Interlock Division Retrieval is executed at step 11104. The subroutine Interlock Division Retrieval will be detailed later. It is then judged at step 11105 whether a pattern agrees with a stored one. If the pattern agrees with the stored one, Output Division Retrieval is executed at step 11106. The subroutine Output Division Retrieval will be detailed later. It is then judged at step 11107 whether a pattern agrees with a stored one. If the pattern agrees with the stored one, control is passed to step 11108. Consistent Pattern Processing is executed and the main routine is terminated. The subroutine Consistent Pattern Processing will be described later.

If it is judged at step 11103 that the pattern disagrees with the stored one, Interlock Division Retrieval is executed at step 11109. If it is judged at step 11110 that the pattern agrees with the stored one, control is passed to step 11108. Consistent Pattern Processing is then executed and the main routine is terminated. If it is judged at step 11110 that the pattern disagrees with the stored one, control is passed to step 11111. Output Division Retrieval is executed. If it is judged at step 11112 that the pattern agrees with the stored one, control is passed to step 11108. Consistent Pattern Processing is then executed and the main routine is terminated. If it is judged at step 11112 that the pattern disagrees with the stored one, Next Circuit Block Retrieval is executed at step 11113. It is judged at step 11114 whether data is found. If no data is found, the main routine is terminated. If data is found, control is passed to step 11102 and the main routine is repeated.

Figure 15:
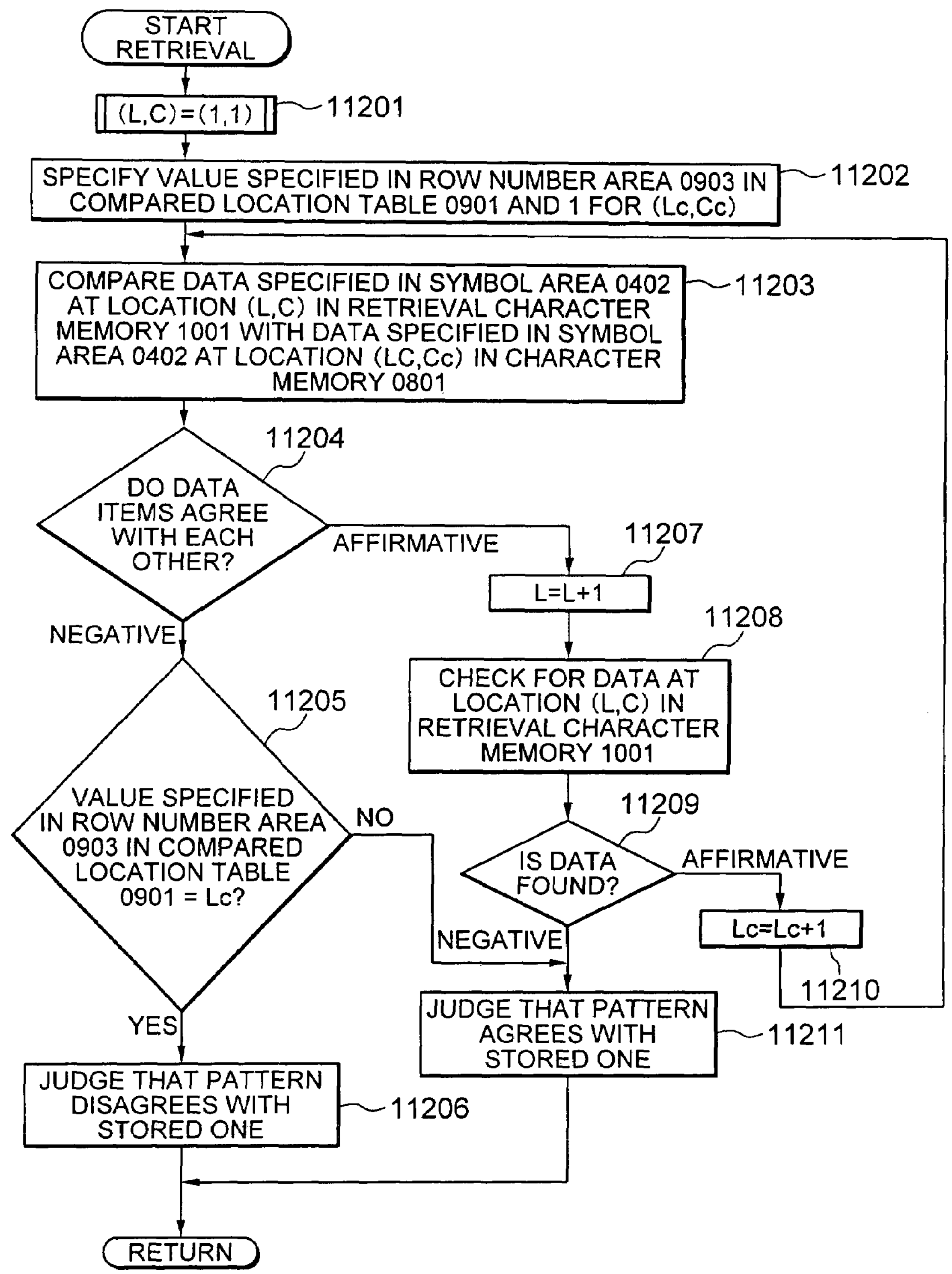
FIG. 15 is a flowchart describing a subroutine Activation Condition Division Retrieval.

Activation Condition Division Retrieval mentioned in the flowchart of FIG. 14 is carried out as described in the flowchart of FIG. 15. First, (1, 1) is specified for a retrieval start location (L, C) at step 11201. The value specified in the row number area 0903 in the compared location table 0901 and 1 are specified for (Lc, Cc) at step 11202. At step 11203, data specified in the symbol area 0402 at the location (L, C) in the retrieval character memory 1001 is compared with data specified in the symbol area 0402 at the location (Lc, Cc) in the character memory 0801.

It is judged at step 11204 whether the data items agree with each other. If the data items disagree with each other, Lc is compared with the value specified in the row number area 0903 in the compared location table 0901. If Lc agrees with the value, it is judged at step 11206 that a pattern disagrees with a stored one, the subroutine is terminated. If it is judged at step 11205 that Lc disagrees with the value, control is passed to step 11211 and it is judged that a pattern agrees with a stored one. The subroutine is then terminated.

If it is judged at step 11204 that the pattern agrees with the stored one, control is passed to step 11207. L is incremented by one. It is then checked at step 11208 whether data is found at the location (L, C) in the retrieval character memory 1001. It is judged at step 11209 whether data is found. If no data is found, control is passed to step 11211 and it is judged that the pattern agrees with the stored one. The subroutine is then terminated. If it is judged at step 11209 that data is found, control is passed to step 11210. Lc is incremented by one, and control is returned to step 11203. The subroutine is then repeated.

Figure 16:
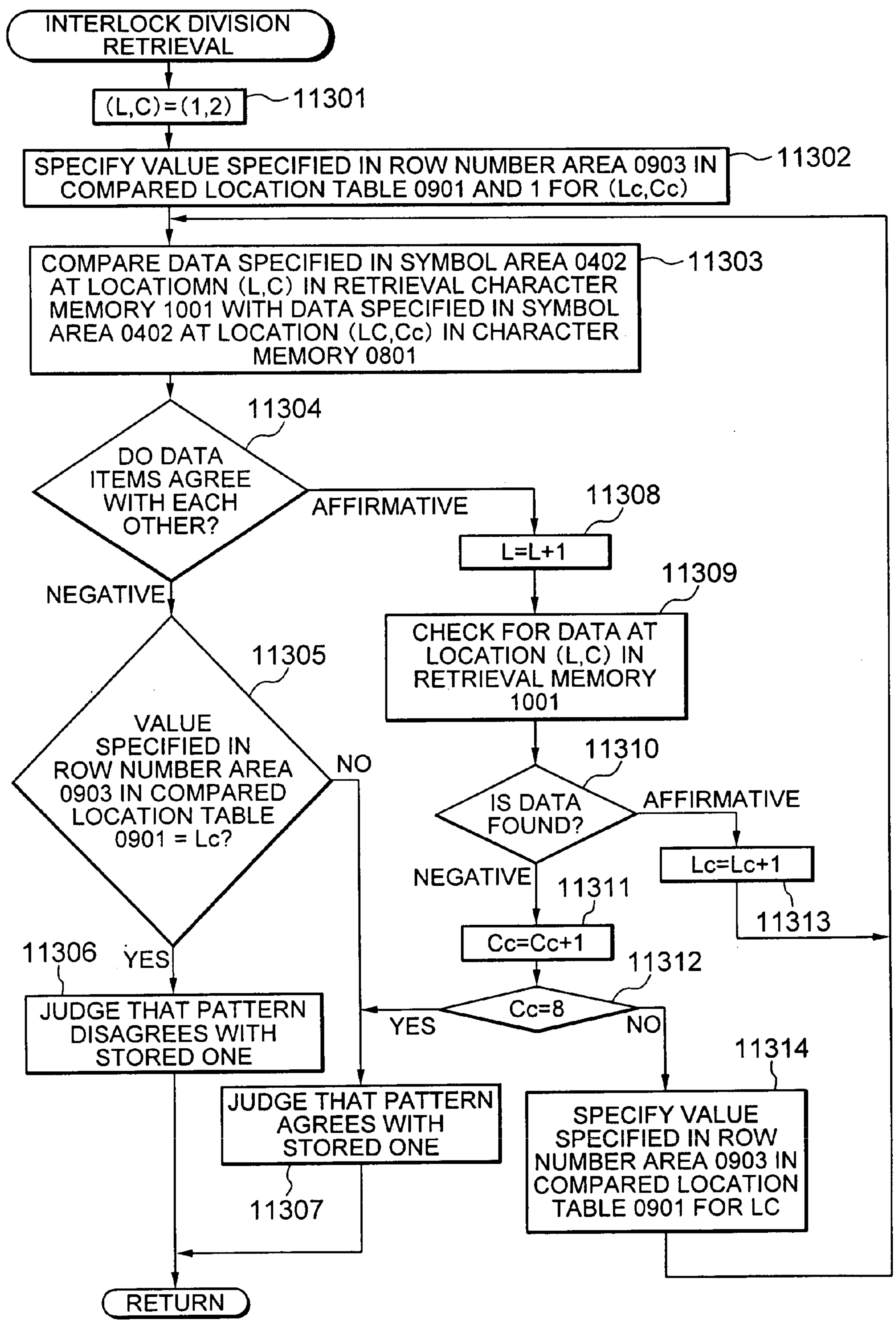
FIG. 16 is a flowchart describing a subroutine Interlock Division Retrieval.

Interlock Division Retrieval mentioned in the flowchart of FIG. 14 is carried out as described in the flowchart of FIG. 16. First, (1, 2) is specified for the retrieval start location (L, C) at step 11301. At step 11302, the value specified in the row number area 0903 in the compared location table 0901 and 2 are specified for (Lc, Cc). At step 11303, data specified in the symbol area 0402 at the location (L, C) in the retrieval character memory 1001 is compared with data specified in the symbol area 0402 at the location (Lc, Cc) in the character memory 0801.

It is judged at step 11304 whether the data items agree with each other. If the data items disagree with each other, Lc is compared with the value specified in the row number area 0903 in the compared location table 0901 at step 11305. If Lc agrees with the value, it is judged at step 11306 that a pattern disagrees with a stored one. The subroutine is then terminated. If it is judged at step 11305 that Lc disagrees with the value, control is passed to step 11307, and it is judged that the pattern agrees with the stored one. The subroutine is then terminated.

If it is judged at step 11304 that the pattern agrees with the stored one, control is passed to step 11308. L is incremented by one. Thereafter, it is checked at step 11309 whether data is found at the location (L, C) in the retrieval character memory 1001. It is judged at step 11310 whether data is found. If no data is found, control is passed to step 11311. Cc is incremented by one. It is judged at step 11312 whether 8 is specified for Cc. If 8 is specified, control is passed to step 11307. It is judged that the pattern agrees with the stored one, and the subroutine is terminated. If it is judged at step 11312 that 8 is not specified, the value specified in the row number area 0903 in the compared location table 0901 is specified for Lc at step 11314. Control is returned to step 11303, and the subroutine is repeated.

If it is judged at step 11310 that data is found, control is passed to step 11313. Lc is incremented by one. Control is then returned to step 11303, and the subroutine is repeated.

Figure 17:
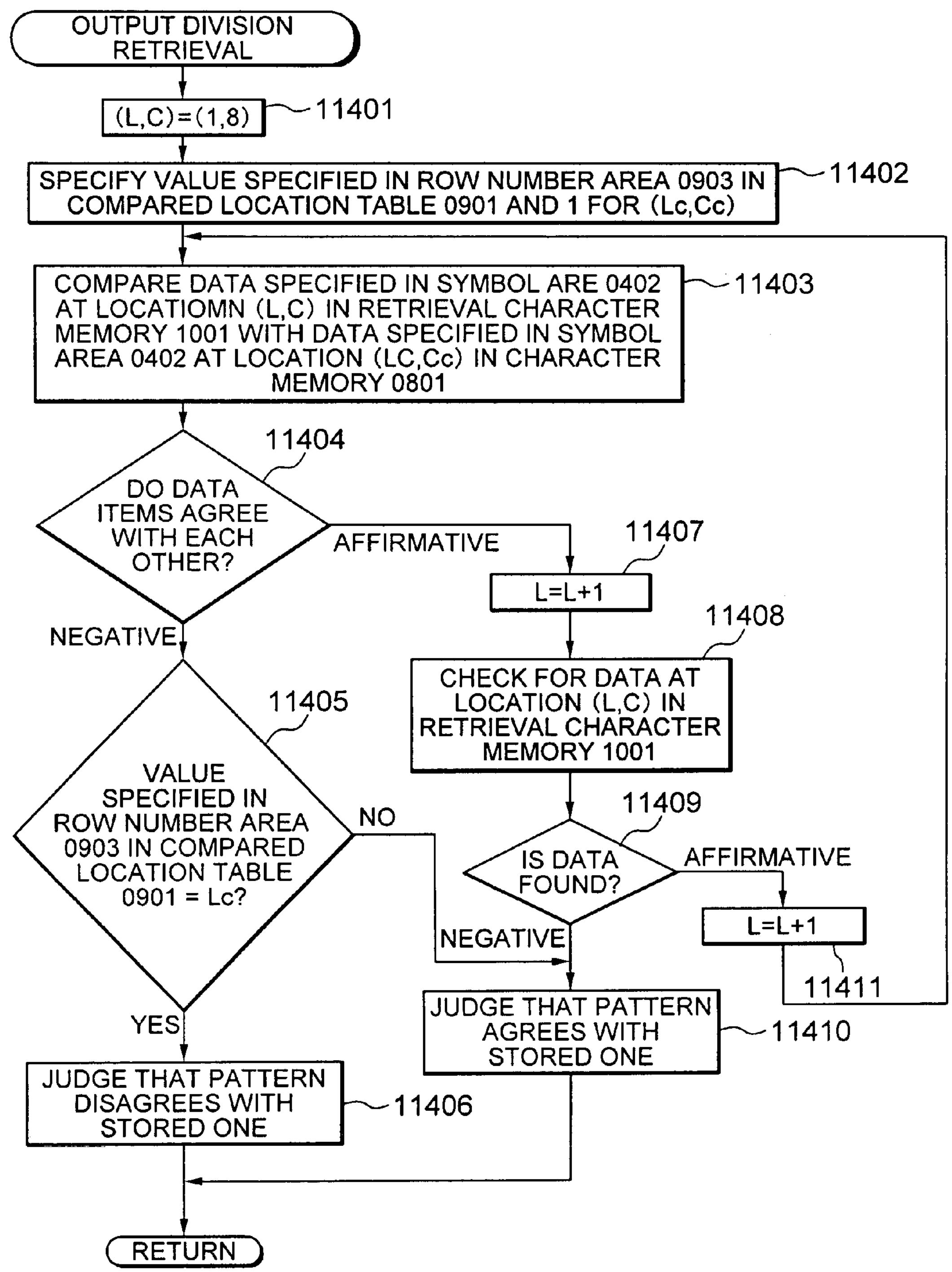
FIG. 17 is a flowchart describing a subroutine Output Division Retrieval.

Output Division Retrieval mentioned in the flowchart of FIG. 14 is carried out as described in the flowchart of FIG. 17. First, (1, 8) is specified for the retrieval start location (L, C) at step 11401. At step 11402, the value specified in the row number area 0903 in the compared location table 0901 and 8 are specified for (Lc, Cc). At step 11403, data specified in the symbol area 0402 at the location (L, C) in the retrieval character memory 1001 is compared with data specified in the symbol area 0402 at the location (Lc, Cc) in the character memory 0801.

It is judged at step 11404 whether the data items agree with each other. If the data items disagree with each other, Lc is compared with the value specified in the row number area 0903 in the compared location table 0901 at step 11405. If the data items agree with each other, it is judged at step 11406 that a pattern disagrees with a stored one. The subroutine is then terminated. If it is judged at step 11405 that the data items disagree with each other, control is passed to step 11410. It is judged that the pattern agrees with the stored one, and the subroutine is terminated.

If it is judged at step 11404 that the pattern agrees with the stored one, control is passed to step 11407. L is incremented by one. It is then checked at step 11408 whether data is found at the location (L, C) in the retrieval character memory 1001. It is judged at step 11409 whether data is found. If no data is found, control is passed to step 11410. It is then judged that the pattern agrees with the stored one, and the subroutine is terminated.

If it is judged at step 11409 that data is found, control is passed to step 11411. Lc is incremented by one. Control is then returned to step 11403, and the subroutine is repeated.

Figure 18A:
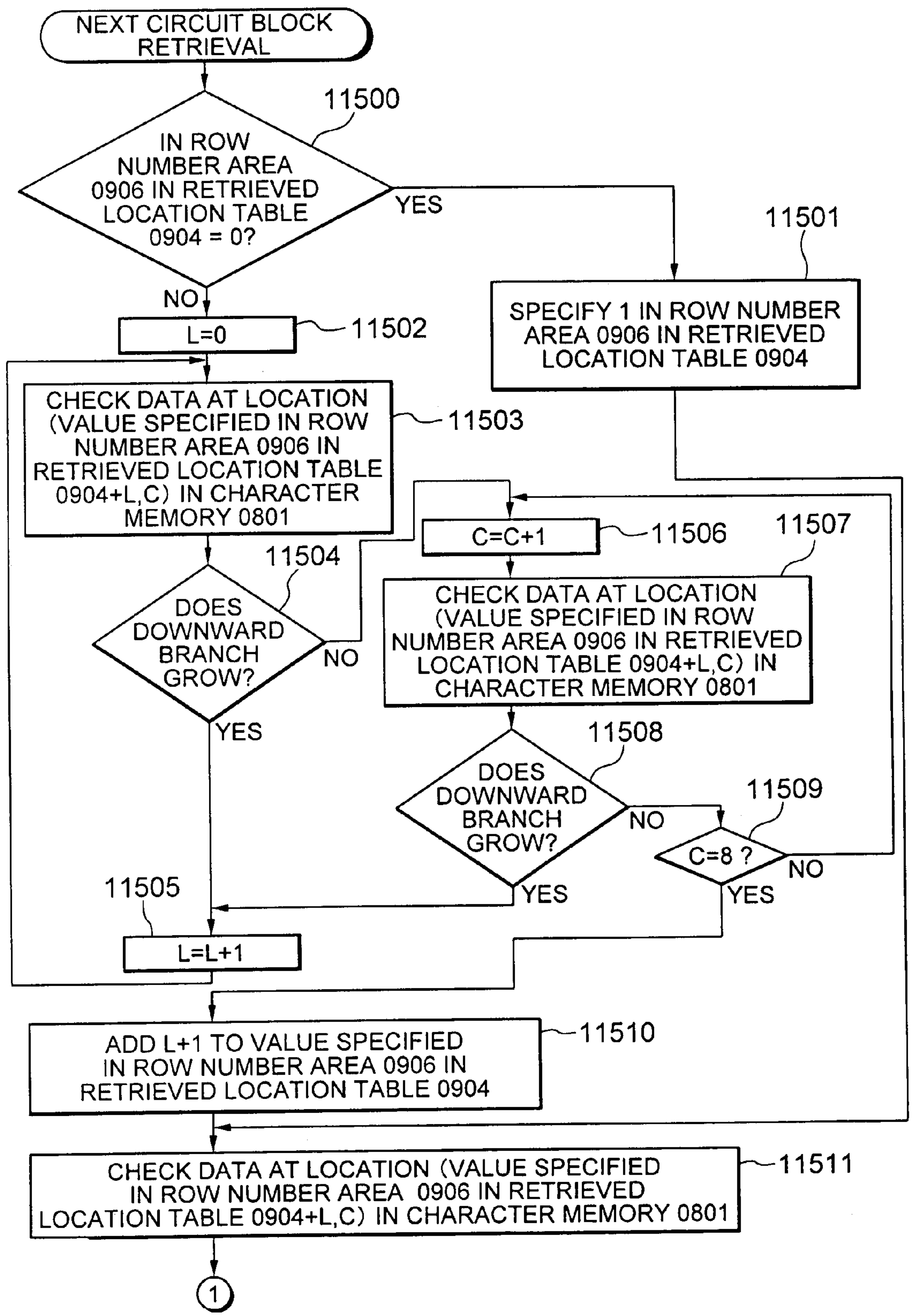
FIG. 18 is a flowchart describing a subroutine Next Circuit Pattern Retrieval.
Figure 18B:
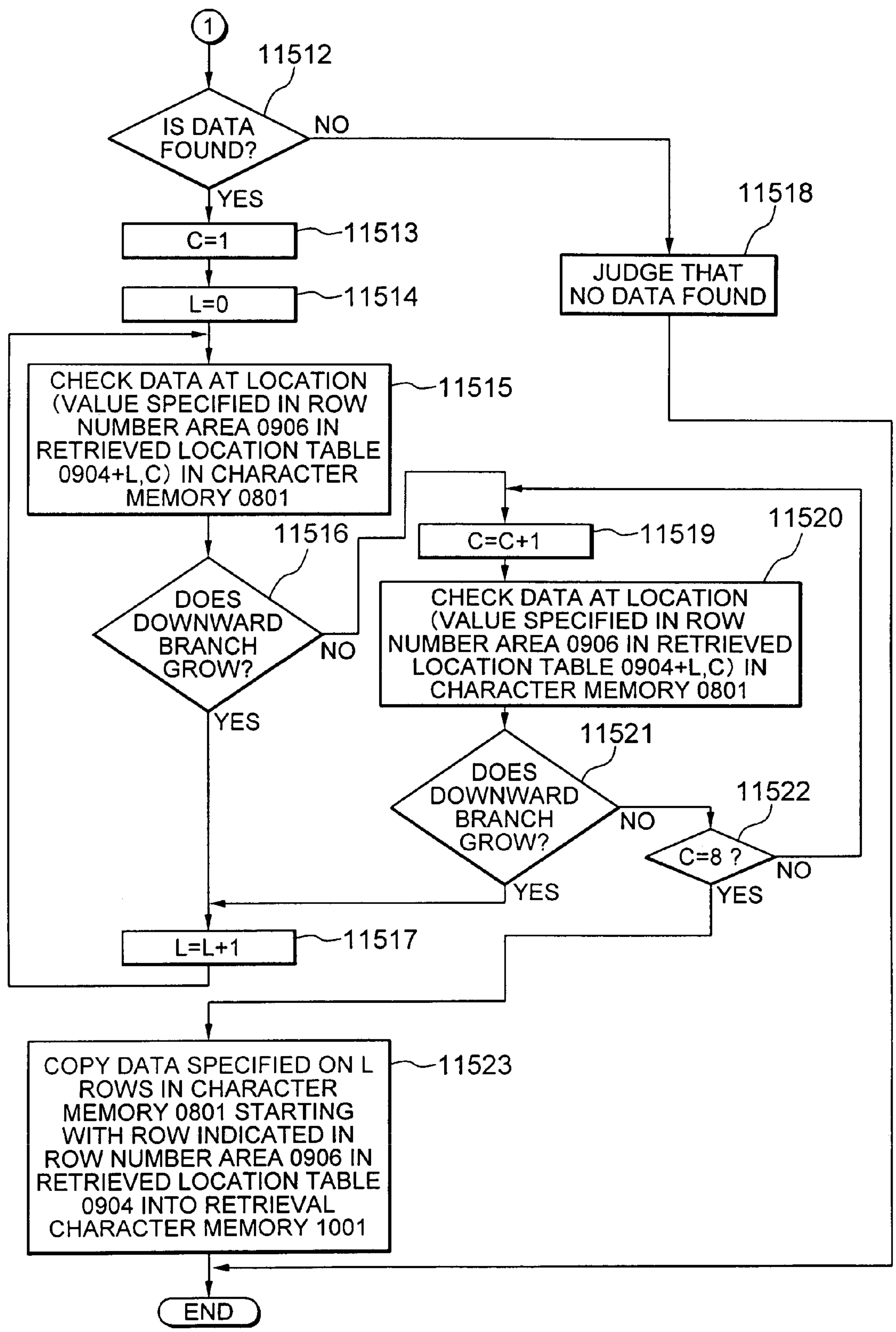

Next Circuit Block Retrieval mentioned in the flowchart of FIG. 14 is carried out as described in the flowchart of FIG. 18. First, it is judged at step 11500 whether 0 is specified in the row number area 0906 in the retrieved location table 0904. If 0 is not specified, (0, 1) is specified for (L, C) at step 11502. It is then checked at step 11503 what data is specified at the location (value specified in the row number area 0906 in the retrieved location table 0904+L, C) in the character memory 0801. It is judged at step 11504 whether the bit indicating "downward" in the branch designation division 0404 of the symbol area 0402 is set to 1. If the bit is set to 1, control is passed to step 11505. L is incremented by one. Control is then returned to step 11503, and the subroutine is repeated.

If it is judged at step 11504 that the bit is not set to 1, it means that no downward branch grows. Control is then passed to step 11506, and C is incremented by one. It is checked at step 11507 what data is specified at the location (value specified in the row number area 0906 in the retrieved location table 0904+L, C) in the character memory 0801. It is judged at step 11508 whether the bit indicating "downward" in the branch designation division 0404 of the symbol area 0402 is set to 1. If the bit is set to 1, control is passed to step 11505 and the subroutine is repeated. If it is judged at step 11508 that the bit is not set to 1, it is judged at step 11509 whether 8 is specified for C. If 8 is not specified for C, control is returned to step 11506, and the subroutine is repeated. If 8 is specified for C, control is passed to step 11510.

At step 11501, L+1 is added to the value specified in the row number area 0906 in the retrieved location table 0904. It is checked at step 11511 what data is specified at the location (value specified in the row number area 0906 in the retrieved location table 0904+L, C) in the character memory 0801. It is judged at step 11512 whether data is found. If data is found, 1 is specified for C at step 11513. 0 is specified for L at step 11514. It is checked at step 11515 what data is specified at the location (value specified in the row number area 0906 in the retrieved location table 0904+L, C) in the character memory 0801. It is judged at step 11516 whether the bit indicating "downward" in the branch designation division 0404 of the symbol area 0402 is set to 1. If the bit is set to 1, L is incremented by one at step 11517. Control is then returned to step 11515, and the subroutine is repeated.

If it is judged at step 11500 that 0 is specified in the row number area 0906 in the retrieved location table 0904, 1 is specified in the row number area 0906 in the retrieved location table 0906 at step 11501. Control is then passed to step 11511. If it is judged at step 11512 that no data is found, it is judged at step 11518 that no data is found. The subroutine is then terminated.

If it is judged at step 11516 that the bit is not set to 1, C is incremented by one at step 11519. It is checked at step 11520 what data is specified at the location (value specified in the row number area 0906 in the retrieved location table 0904+L, C) in the character memory 0801. It is judged at step 11521 whether the bit indicating "downward" in the branch designation division 0404 of the symbol area 0402 is set to 1. If the bit is set to 1, control is passed to step 11517 and the subroutine is repeated. If the bit is not set to 1, it is judged at step 11522 whether 8 is specified for C. If 8 is specified for C, control is passed to step 11523. Data specified on L rows starting with the row whose number is specified in the row number area 0906 in the retrieved location table 0904 is copied from the character memory 0801 into the retrieval character memory 1001. The subroutine is then terminated. If it is judged at step 11522 that 8 is not specified for C, control is returned to step 11519, and the subroutine is repeated.

When the foregoing steps have been completed, data specified on rows in the character memory 0801 and indicating circuit elements that agree with the stored ones has been copied into the retrieval character memory 1001. In the present example, data specified on the third and fourth rows in the character memory 0801 has been copied into the retrieval character memory 1001.

The foregoing steps, that is, the steps described in the flowcharts of FIG. 14, FIG. 15, FIG. 16, FIG. 17, and FIG. 18 constitute a circuit pattern extracting means. The circuit pattern extracting means compares a circuit element contained in a circuit pattern, which is being stored in the character memory 0802 serving as an available area, with a circuit element contained in a circuit pattern stored in the character memory 0801 serving as an unavailable area. The circuit pattern extracting means extracts a circuit pattern containing a circuit element that agrees with a stored one.

Figure 19:
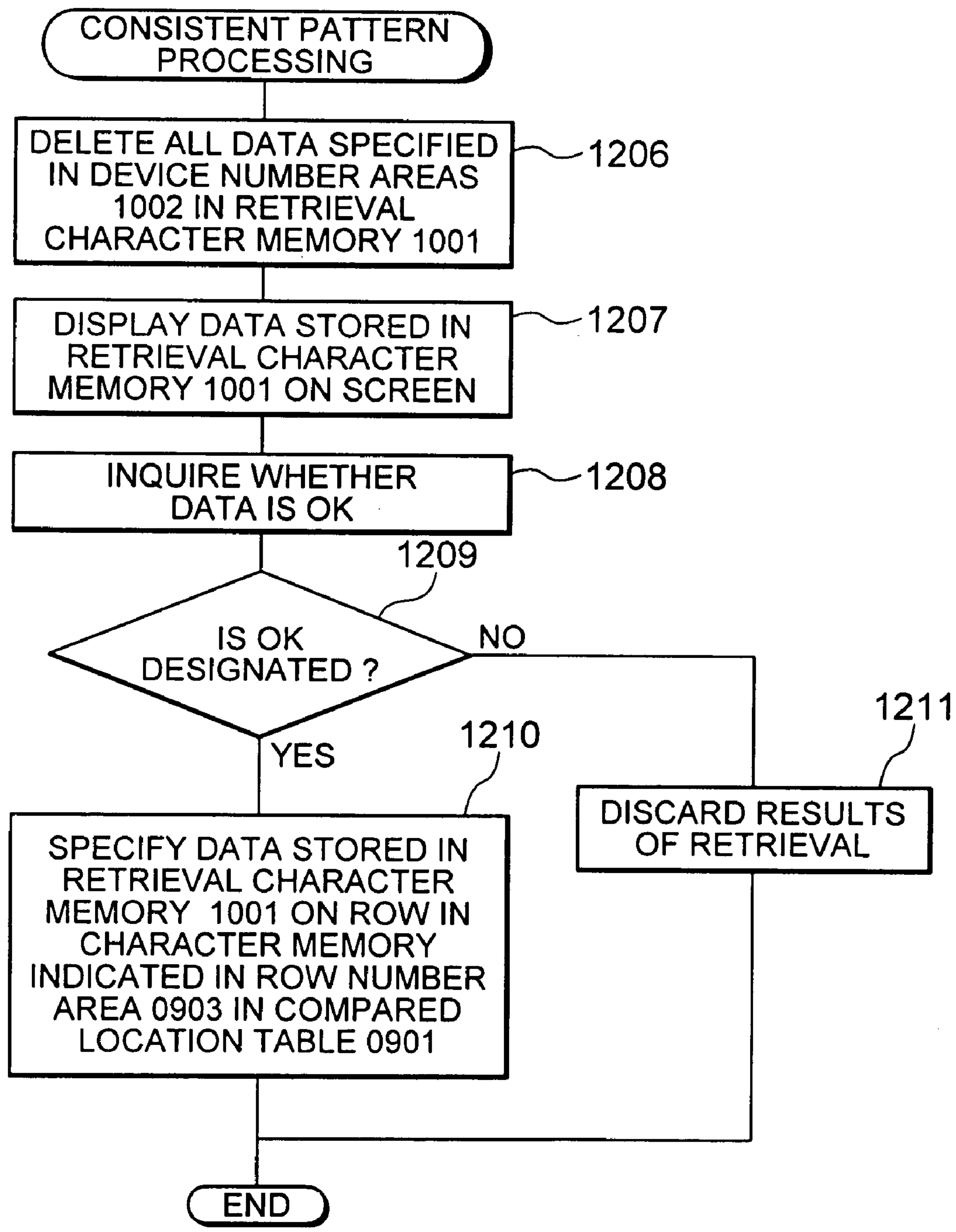
FIG. 19 is a flowchart describing a subroutine Consistent Pattern Processing.
Figure 20:
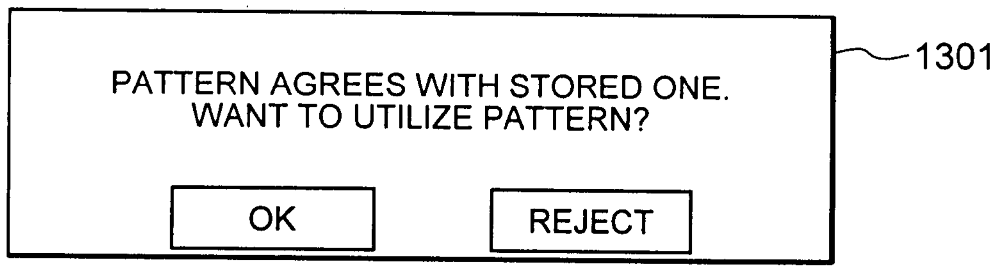
FIG. 20 shows an example of a message to be displayed on a CRT when a pattern agrees with a stored one.

Consistent Pattern Processing invoked at step 11108 in the flowchart of FIG. 14 is carried out as described in the flowchart of FIG. 19. First, data specified in the device number areas 1002 in the retrieval character memory 1001 is deleted at step 1206. Data stored in the retrieval character memory 1001 is displayed on the screen of the CRT 0102 at step 1207. It is inquired at step 1208 if the data is acceptable. The inquiry is made with the message 1301 displayed as shown in FIG. 20. Steps 1207 and 1208 constitute a display means for displaying a circuit pattern extracted by the circuit pattern extracting means on the input screen of the CRT 0102.

Thereafter, an operator makes an entry using, for example, the keyboard 0103. If it is judged at step 1209 that OK is not designated, the results of retrieval are discarded at step 1211. The subroutine is then terminated.

In contrast, if it is judged at step 1209 that OK is designated, control is passed to step 1210. Data stored in the retrieval character memory 1001 is placed on a row in the character memory 0801 indicated in the row number area 0903 in the compared location table 0901. In other words, data stored in the retrieval character memory 1001 is copied into the character memory 0801. The step 1210 realizes a copying means for copying a circuit pattern extracted by the circuit pattern extracting means into the character memory 0801 serving as an available area.

When data stored in the retrieval character memory 1001 has been copied into the character memory 0801, a ladder diagram looks like the ladder diagram 1310 shown in FIG. 21. A character memory allocated to the ladder diagram looks like the character memory 1311 shown in FIG. 22. At this time, the ladder diagram looks like the ladder diagram 1310. Thus, patterns agreeing with the stored ones are automatically added to the ladder diagram. Thereafter, device numbers are input in order to complete the ladder diagram.

In the thus configured ladder circuit editing system, when an operator presses the function key 0110 in the course of storing data in the available area, a circuit pattern whose circuit element agrees with the one whose data is being stored is extracted from the unavailable area in which already input data is stored. The circuit pattern is then automatically displayed at a position on the screen at which an entry is made. An operator need not perform extra work, but an analogous ladder diagram can be retrieved automatically. An unnecessarily large area in a memory will not be occupied, but the efficiency in designing a ladder diagram can be improved.

An operator may not adopt the results of retrieval but may additionally record another circuit element in the character memory 0801 serving as an available area. In this case, if the operator presses the function key 0110, a circuit pattern containing the circuit element is retrieved under a different condition (that is, the number of circuit elements contained in the circuit pattern has increased).

EXAMPLE 2

Figure 23:
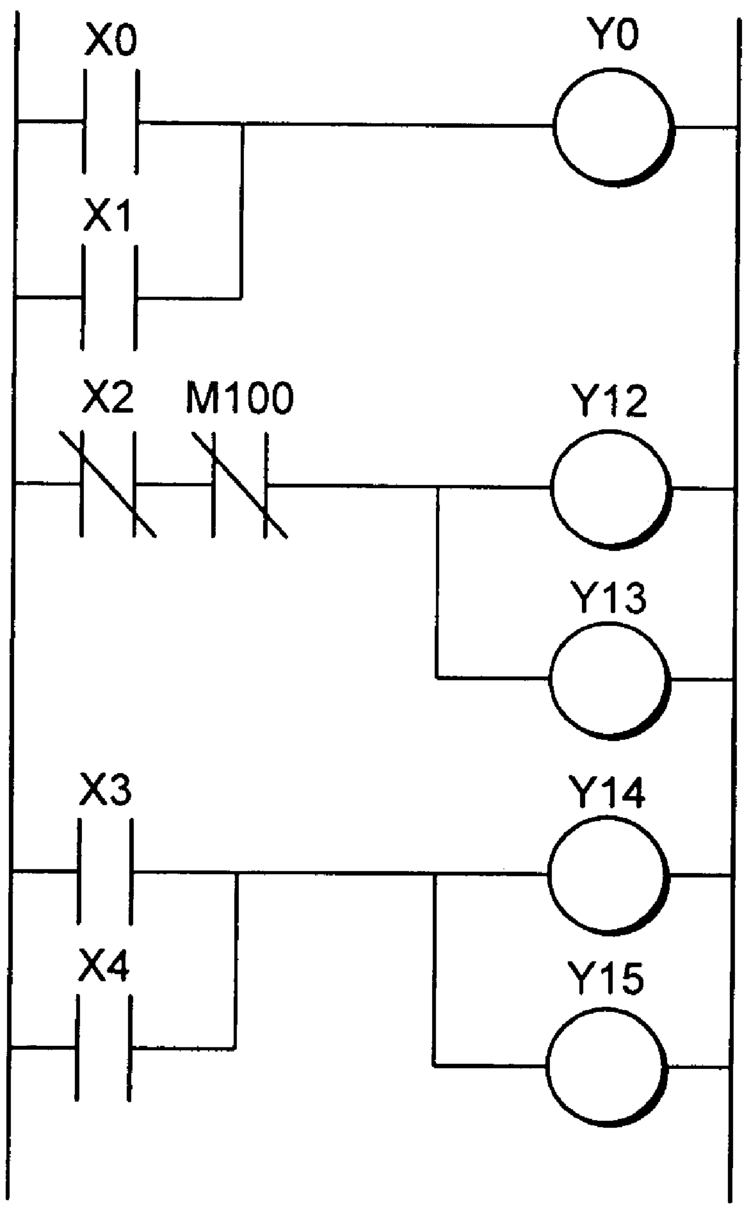
FIG. 23 shows another example of a ladder diagram.

FIG. 23 shows another example of a ladder diagram. Referring to FIG. 23, reference numeral 1401 denotes a ladder diagram.

Figure 24:
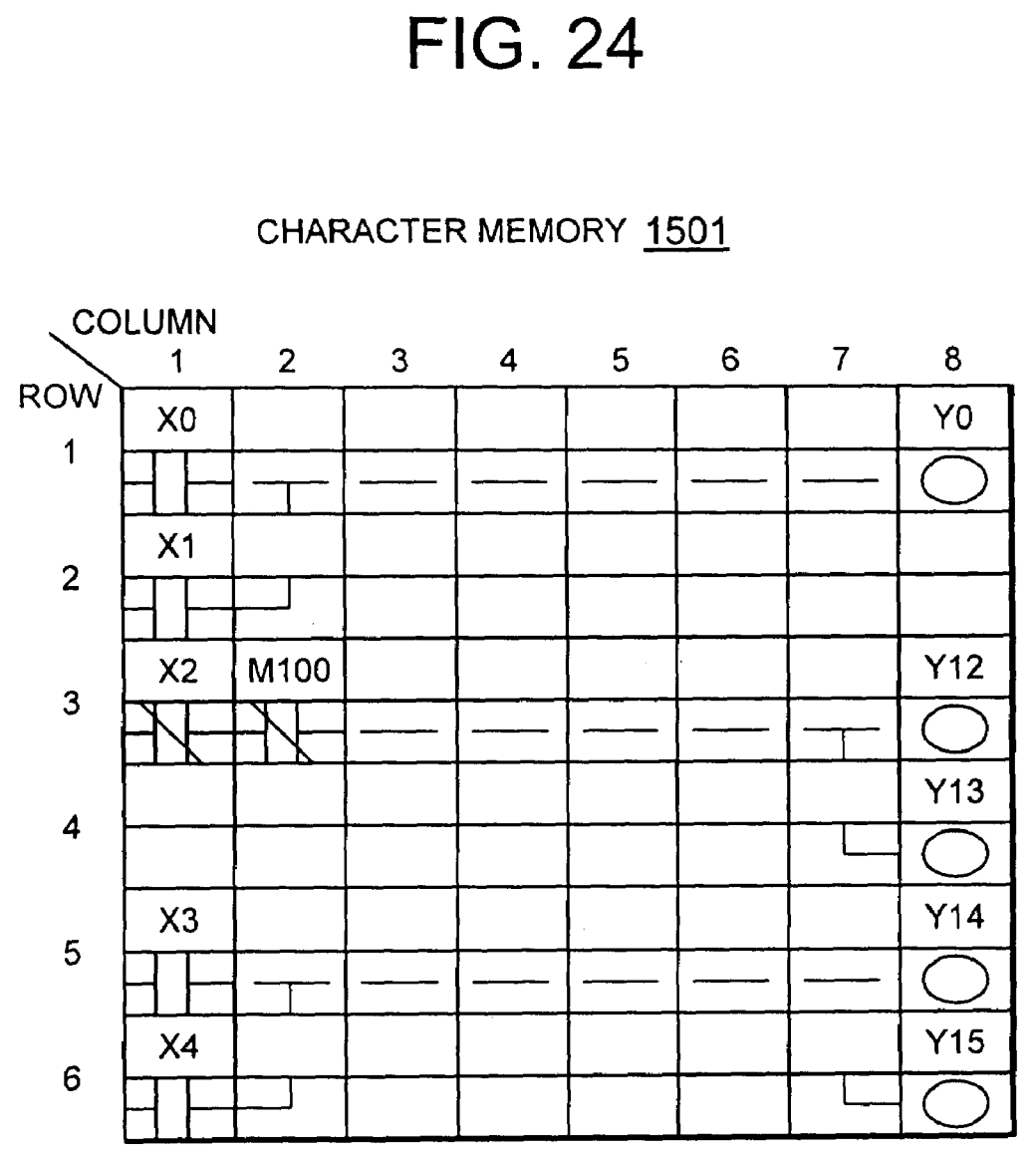

FIG. 24 shows the structure of a character memory in which the ladder diagram 1401 is stored. Referring to FIG. 24, reference numeral 1501 denotes a character memory.

Figure 25:
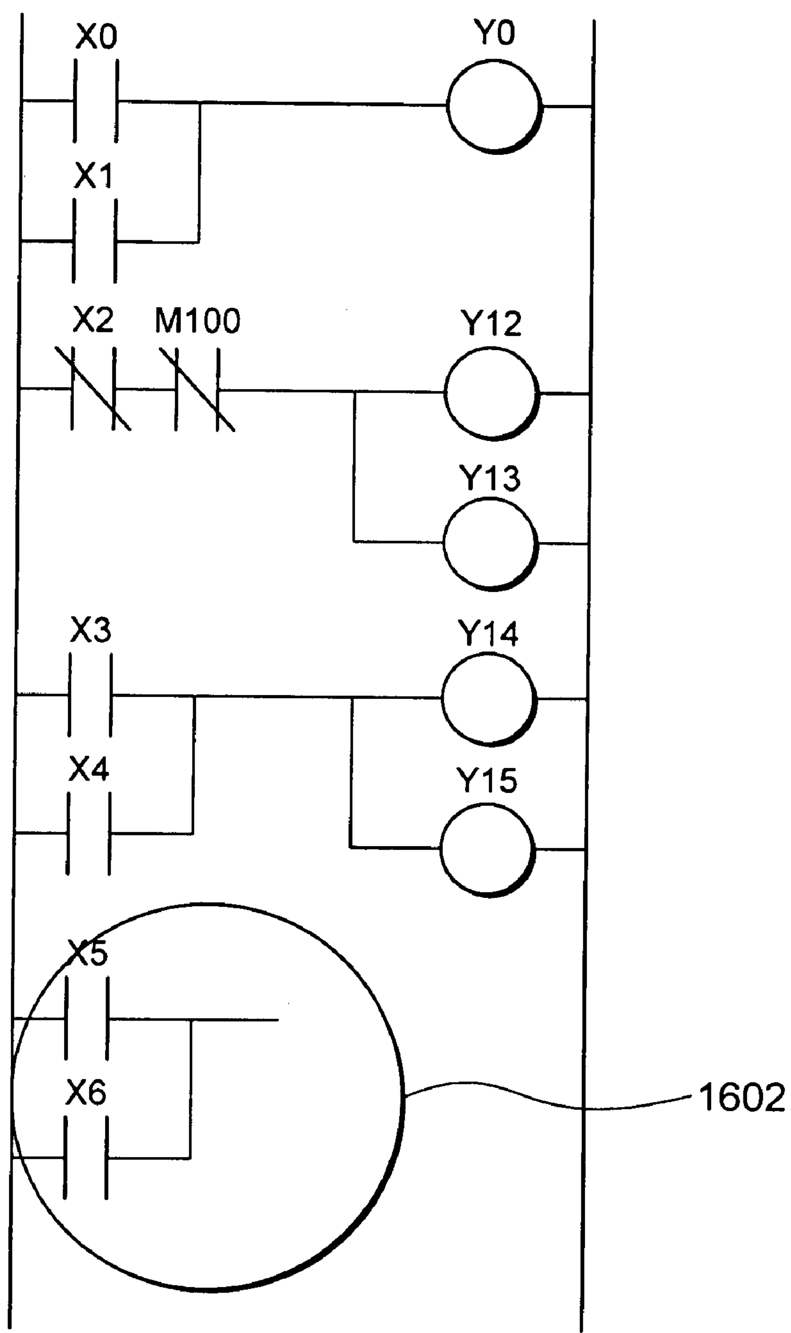
FIG. 25 shows the ladder diagram, which is shown in FIG. 23, having part of additional circuit elements added thereto.

FIG. 25 shows the ladder diagram 1401 shown in FIG. 23 to which another circuit elements are added. Referring to FIG. 25, reference numeral 1601 denotes a ladder diagram and 1602 denotes an additional circuit block.

Figure 26:
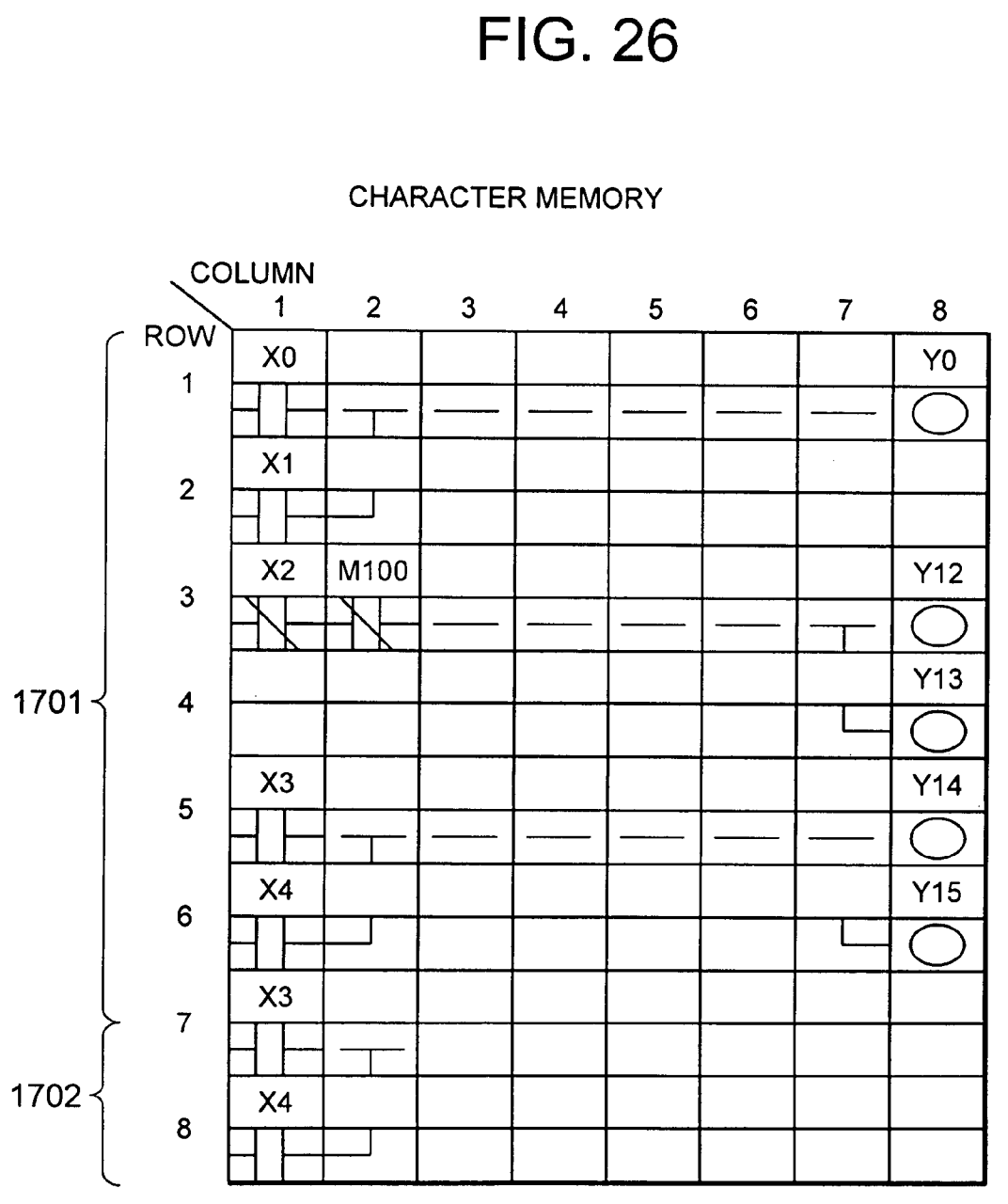

FIG. 26 shows the structure of a memory defined in the memory 0109 in which the ladder diagram 1601 is stored, that is, a character memory. Referring to FIG. 26, reference numerals 1701 and 1702 denotes character memories defined at predetermined locations in the memory 0109. The character memory 1701 serves as an unavailable area in which at least one circuit pattern that has been input is stored. In contrast, the character memory 1702 is a character memory allocated to the additional circuit block 1602 and serving as an available area in which a new circuit pattern is stored.

FIG. 27 and FIG. 28 show the structures of character memories in which a ladder diagram to be compared with a stored one is temporarily saved. Referring to FIG. 27 and FIG. 28, reference numerals 1703 and 1705 denote retrieval character memories. 1704 and 1706 denote device number areas in the retrieval character memories 1703 and 1705 respectively.

Figure 29:
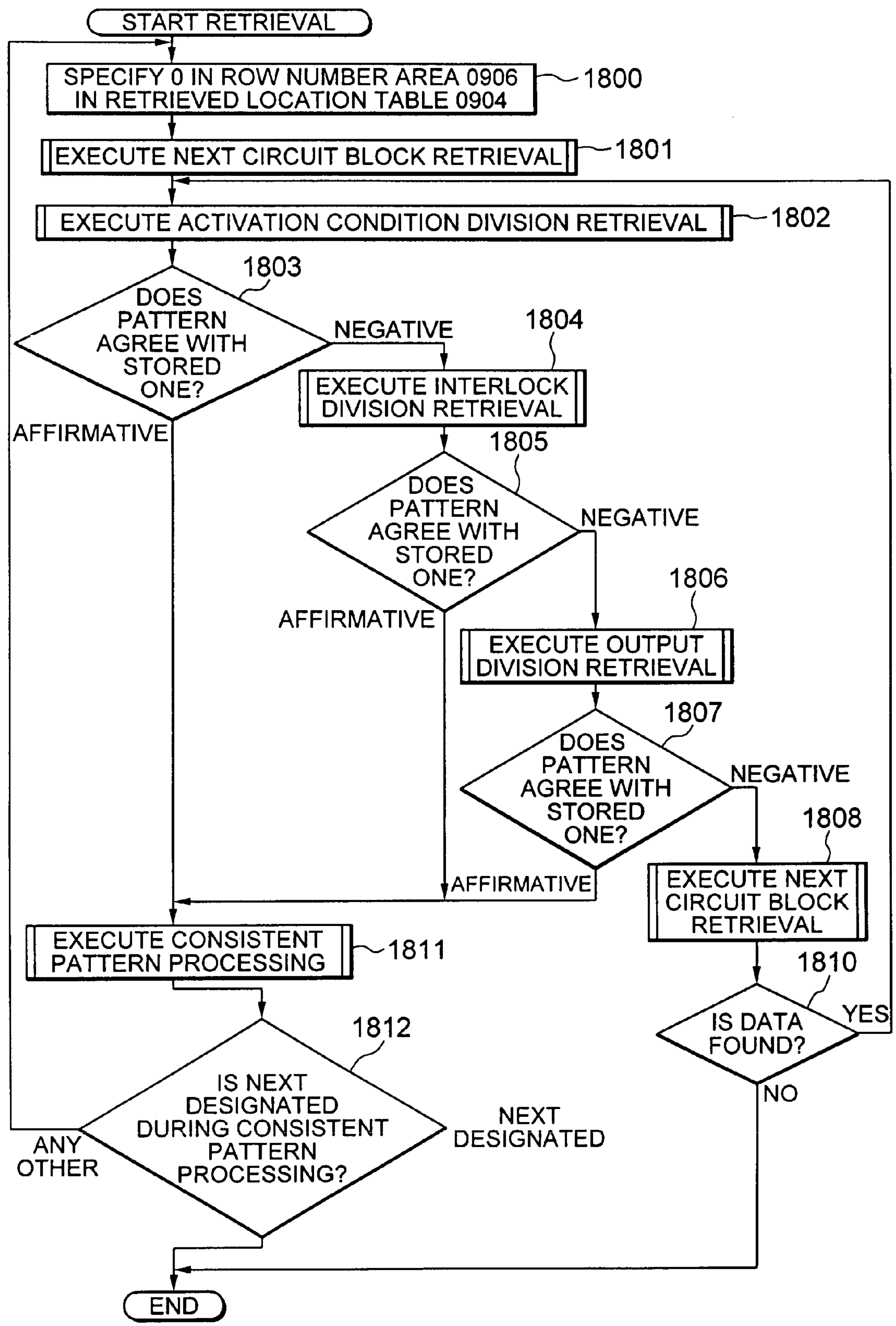
FIG. 29 is a flowchart describing a main program Retrieval.
Figure 30:
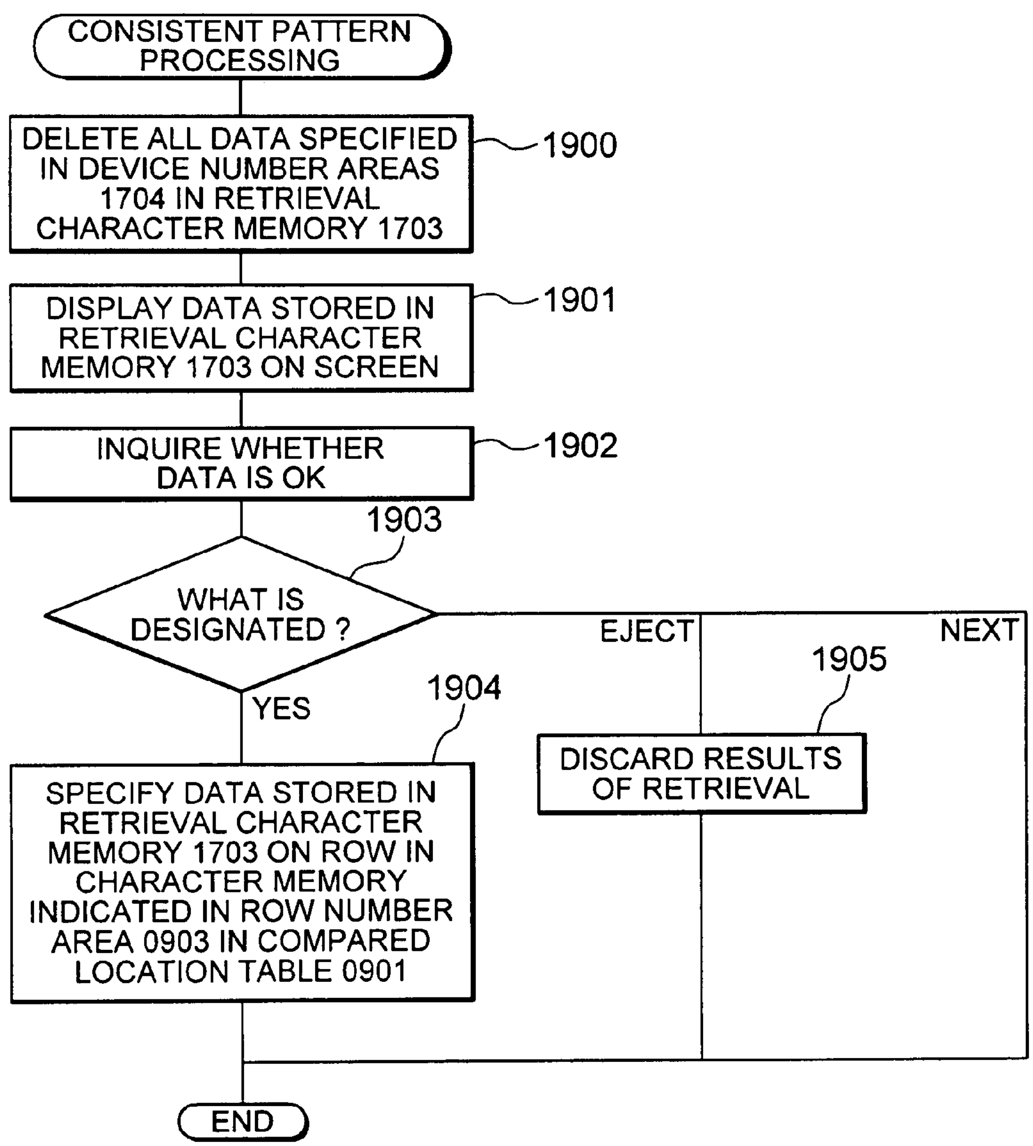
FIG. 30 is a flowchart describing a subroutine Consistent Pattern Processing.
Figure 31:
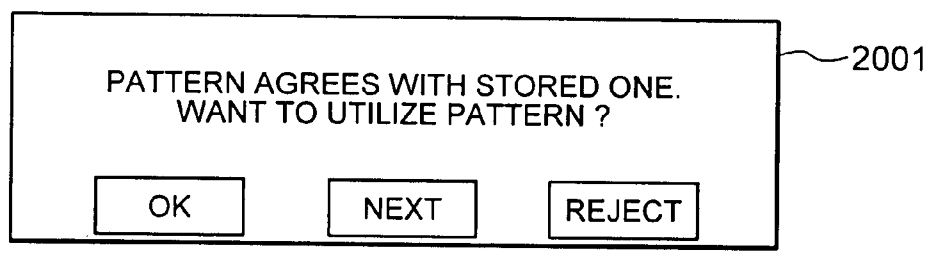
FIG. 31 shows an example of a message to be displayed on a CRT when a pattern agrees with a stored one.

FIG. 29 and FIG. 30 are flowcharts describing processing performed by the processing unit 0105. FIG. 31 shows an example of a message to be displayed on the CRT when a pattern agrees with a stored one. Referring to FIG. 31, reference numeral 2001 denotes a message.

Assume that the ladder diagram 1401 shown in FIG. 23 has already been produced and the character memory 1501 allocated to the ladder diagram has already been defined as shown in FIG. 24. A discussion will be made on a case where a description of the additional circuit block 1602 is added to the program expressed in the form of the ladder diagram 1401 (FIG. 25). The addition of the additional part 1602 changes the character memory as shown in FIG. 26.

In this state, the keyboard 0103 is used to issue a Retrieve instruction. The Retrieve instruction is issued with a press of, for example, the function key 0110 on the keyboard 0103. With the press of the function key 0110, row number 7 to be allocated to the additional circuit block 1602 is specified in the row number area 0903 in the compared location table 0901. Thereafter, Retrieval is started. For retrieval, first, it is checked if a pattern specified in the activation condition division 0203 agrees with a stored one. Secondly, it is checked if a pattern specified in the interlock division 0204 agrees with a stored one. Finally, it is checked if a pattern specified in the output division 0205 agrees with a stored one. Retrieval is carried out as described in the flowchart of FIG. 29.

The procedure of retrieval will be described in conjunction with the flowchart of FIG. 29. When Retrieval is started, first, 0 is specified in the row number area 0906 in the retrieved location table 0904 at step 1800. Next Circuit Block Retrieval is executed at step 1801. Activation Condition Division Retrieval is executed at step 1802. It is judged at step 1803 whether a pattern agrees with a stored one. If the pattern agrees with the stored one, control is passed to step 1811. Consistent Pattern Processing is then executed.

If it is judged at step 1803 that the pattern disagrees with the stored one, Interlock Division Retrieval is executed at step 1804. If it is judged at step 1805 that a pattern specified in the interlock division agrees with a stored one, control is passed to step 1811. Consistent Pattern Processing is then executed.

If it is judged at step 1805 that the pattern disagrees with the stored one, control is passed to step 1806. Output Division Retrieval is then executed. If it is judged at step 1807 that a pattern agrees with a stored one, control is passed to step 1811. Consistent Pattern Processing is then executed. If it is judged at step 1807 that the pattern disagrees with the stored one, Next Circuit Block Retrieval is executed at step 1808. It is judged at step 1810 whether another circuit block is specified. If another circuit block is not specified, Retrieval is terminated. If another circuit block is specified, control is returned to step 1802. The main routine is continued. It is judged at step 1812 whether Next is designated during Consistent Pattern Processing. If Next is designated, control is returned to step 1801. If it is judged at step 1812 that any instruction other than Next is designated, it is judged that retrieval is completed. The main routine is terminated.

Next Circuit Block Retrieval of step 1801, Activation Condition Division Retrieval of step 1802, Interlock Division Retrieval of step 1804, Output Division retrieval of step 1806, and Next Circuit Block Retrieval of step 1801 are the same subroutines as those invoked in Example 1.

When Consistent Pattern Processing is invoked at step 1811 described in the flowchart of FIG. 29, the subroutine is carried out as described in the flowchart of FIG. 30. First, all data specified in the device number areas 1704 in the retrieval character memory 1703 is deleted at step 1900. Data stored in the retrieval character memory 1703 is displayed on the screen of the CRT 0102 at step 1901. The message 2001 shown in FIG. 31 is displayed at step 1902. It is then inquired whether a displayed circuit pattern is utilized. The step 1901 and step 1902 constitute a display means for displaying a circuit pattern extracted by the circuit pattern extracting means on the input screen of the CRT 0102.

Thereafter, an operator makes an entry using, for example, the keyboard 0103. If it is judged at step 1903 that OK is designated, control is passed to step 1904. Data stored in the retrieval character memory 1703 is specified on a row in the character memory indicated in the row number area 0903 in the compared location table 0901. In other words, data stored in the retrieval character memory 1703 is copied into the character memory. The step 1904 realizes a copying means for copying a circuit pattern extracted by the circuit pattern extracting means into the character memory 0801 serving as an available area.

If it is judged at step 1903 that Next is designated, nothing is performed and Consistent Pattern Processing is terminated. If it is judged at step 1903 that Reject is designated, the results of retrieval are discarded at step 1905. The subroutine is terminated.

If it is judged at step 1903 that Next is designated, Next Circuit Block Retrieval is carried out as described in the flowchart of FIG. 29. If Next is designated in relation to the ladder diagram shown in FIG. 25, the retrieval character memory 1704 is defined. The subroutine described in the flowchart of FIG. 29 is then carried out.

The thus configured ladder circuit editing system provides the same advantages as those of Example 1. In addition, a plurality of analogous ladder diagrams can be retrieved automatically. The efficiency in designing a ladder diagram can be further improved.

EXAMPLE 3

Figure 32:
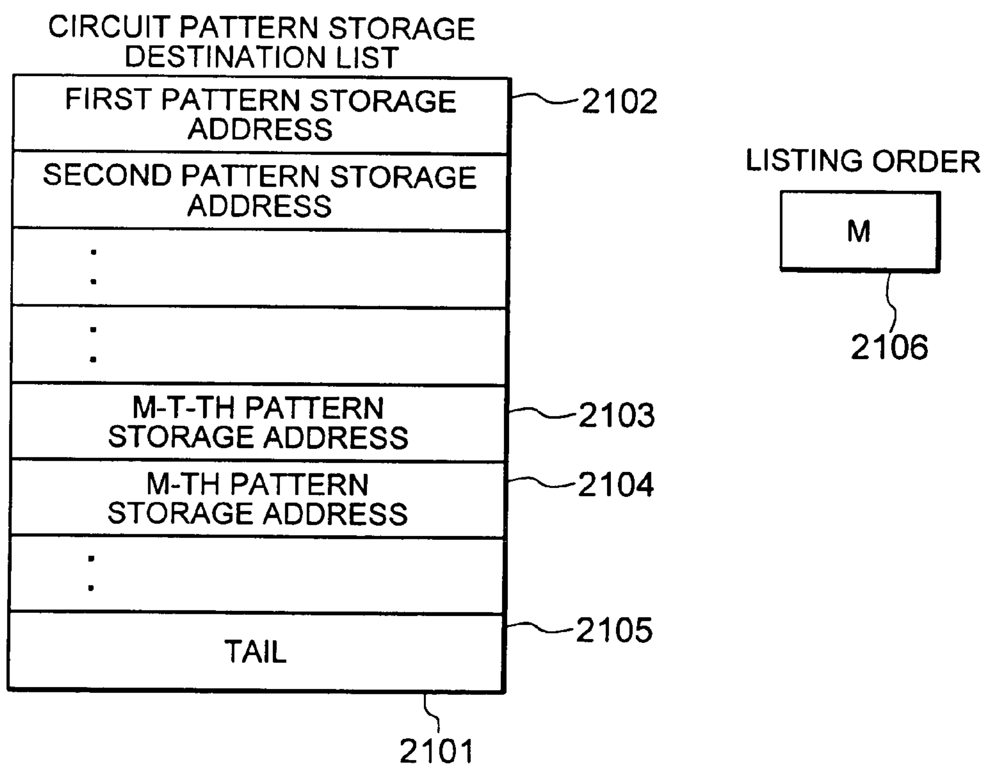
FIG. 32 shows a table that is a circuit pattern storage destination list.

FIG. 32 shows a circuit pattern storage destination list table. Referring to FIG. 32, reference numeral 2101 denotes a circuit pattern storage destination list defined in a selected circuit pattern address storage area. 2102 denotes a first pattern storage address. 2103 denotes an M-1-th pattern storage address. 2104 denotes an M-th pattern storage address. 2105 denotes the tail of the list. 2106 denotes a listing order M.

FIG. 33 shows a circuit pattern storage area. Referring to FIG. 33, reference numeral 2107 denotes a circuit pattern storage area.

FIG. 34 shows a circuit pattern location table. Reference numeral 2201 denotes a circuit pattern location table, 2202 denotes a column number area, and 2203 denotes a row number area.

FIG. 35 shows a circuit pattern location character memory table. Reference numeral 2204 denotes a circuit pattern location character memory table. 2205 denotes a device number area, and 2206 denotes a symbol area.

Figure 36:
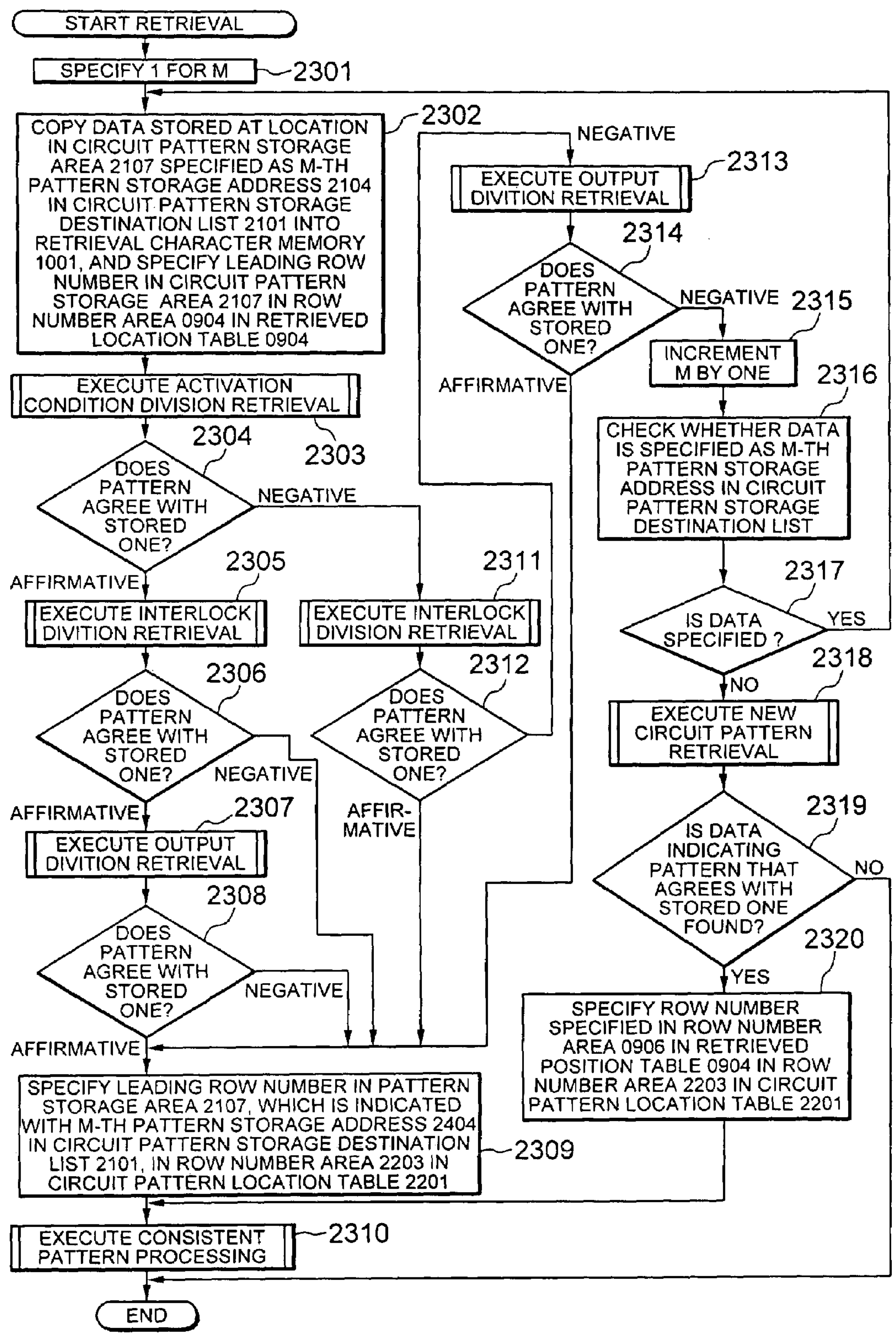
FIG. 36 is a flowchart describing a main program Retrieval.
Figure 37:
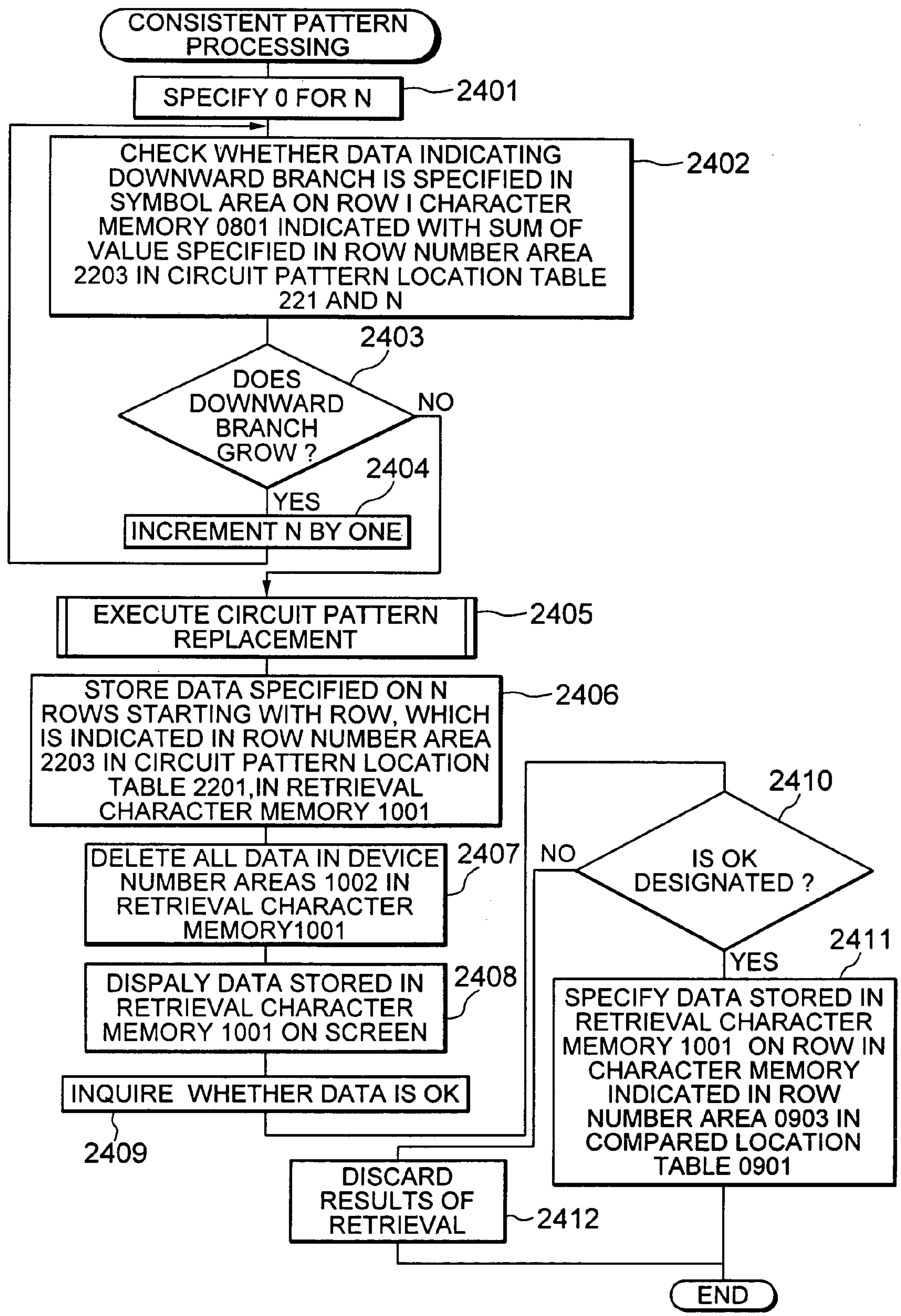
FIG. 37 is a flowchart describing a subroutine Consistent Pattern Processing.
Figure 38:
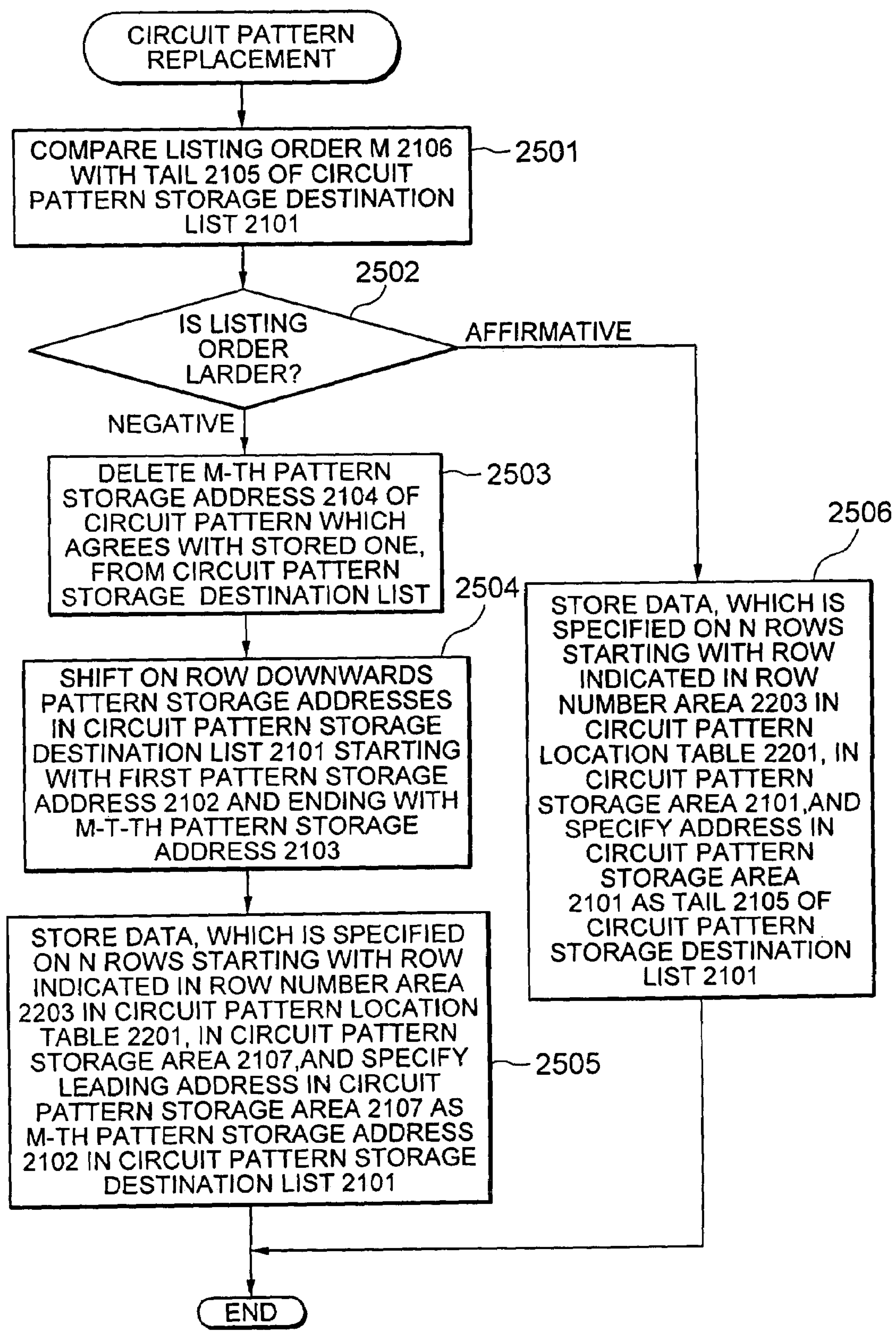
FIG. 38 is a flowchart describing a subroutine Circuit Pattern Replacement.

FIG. 36, FIG. 37, and FIG. 38 are flowcharts describing the processing performed by the processing unit 0105. Assume that the ladder diagram 0501 shown in FIG. 7 has already been produced and the character memory 0601 allocated to the ladder diagram has been defined in the memory 0109 as shown in FIG. 8.

A description of the command 0702 is added to the program expressed in the form of the ladder diagram (FIG. 9). The addition of the command 0702 changes the character memory 0601 as shown in FIG. 10.

In this state, the keyboard 0103 is used to issue a Retrieve instruction. The Retrieve instruction is issued with a press of, for example, the function key 0110 on the keyboard 0103. With the press of the function key 0110, row number 5 in the character memory 0802 allocated to the additional circuit block is specified in the row number area 0903 in the compared location table 0901. Thereafter, Retrieval is started. For retrieval, first, it is checked if a pattern specified in the activation condition division 0203 agrees with a stored one. Secondly, it is checked if a pattern specified in the interlock division 0204 agrees with a stored one. Finally, it is checked if a pattern specified in the output division 0205 agrees with a stored one. Retrieval is carried out as described in the flowchart of FIG. 36.

The procedure of retrieval will be described in conjunction with the flowchart of FIG. 36. When Retrieval is started, first, 1 is specified for M at step 2301. At step 2302, data specified on the leading row number in the circuit pattern storage area 2107 indicated as the M-th pattern storage address 2104 in the circuit pattern storage destination list 2101 is copied into the retrieval character memory 1001. Moreover, the leading row number in the circuit pattern storage area 2107 is specified in the row number area 0906 in the retrieved location table 0904.

At step 2303, Activation Condition Division Retrieval is carried out as described in the flowchart of FIG. 15. It is judged at step 2304 whether a pattern agrees with a stored one. If the pattern agrees with the stored one, Interlock Division Retrieval is carried out at step 2305 as described in the flowchart of FIG. 16. It is then judged at step 2306 whether a pattern agrees with a stored one. If the pattern agrees with the stored one, Output Division Retrieval is carried out at step 2305 as described in the flowchart of FIG. 17. It is then judged at step 2308 whether a pattern agrees with a stored one. If the pattern agrees with the stored one, control is passed to step 2309. The leading row number in the circuit pattern storage area 2107 indicated with the M-th pattern storage address 2104 in the circuit pattern storage destination list 2101 is specified in the row number area 2203 in the circuit pattern location table 2201. At step 2310, Consistent Pattern Processing is executed. The main routine is then terminated.

If it is judged at step 2304 that the pattern disagrees with the stored one, Interlock Division Retrieval is executed at step 2311. If it is judged at step 2312 that a pattern agrees with a stored one, control is passed to step 2309 and step 2310. Consistent Pattern Processing is then executed, and the main routine is terminated. If it is judged at step 2312 that the pattern disagrees with the stored one, control is passed to step 2313. Output Division Retrieval is then executed. If it is judged at step 2314 that a pattern agrees with a stored one, control is passed to step 2309 and step 2310. Consistent Pattern Processing is then executed, and the main routine is terminated.

If it is judged at step 2314 that the pattern disagrees with the stored one, M is incremented by one at step 2315. It is then checked at step 2316 whether data is specified as the M-th pattern storage address in the circuit pattern storage destination list. If it is judged at step 2317 that data is specified, control is returned to step 2302.

If it is judged at step 2317 that no data is specified, control is passed to step 2318. New Circuit Pattern Retrieval is then executed. It is judged at step 2319 whether any new data agrees with stored one. If it is judged that new data agrees with the stored one, control is passed to step 2320. The row number specified in the row number area 0906 in the retrieved location table 0904 is specified in the row number area 2203 in the circuit pattern location table 2201. Consistent Pattern Processing is then executed at step 2310. The main routine is then terminated. If it is judged at step 2319 that no new data agrees with stored one, the main routine is terminated.

Consistent Pattern Processing of step 2310 is carried out as described in the flowchart of FIG. 37. First, 0 is specified for N at step 2401. It is checked at step 2402 whether data indicating a downward branch is specified in any symbol area on a row in the character memory 0801 indicated with the sum of the value specified in the row number area 2203 in the circuit pattern location table 2201 and N. If it is judged at step 2403 that a downward branch grows, control is passed to step 2404. N is incremented by one at step 2404. If it is judged at step 2403 that no downward branch grows, control is passed to step 2405.

Circuit Pattern Replacement of step 2405 is carried out as described in the flowchart of FIG. 38. First, the listing order M 2106 is compared with the tail 2105 of the circuit pattern storage destination list 2101 at step 2501. If it is judged at step 2502 that the listing order M 2106 is larger, control is passed to step 2506. Data specified on N rows starting with a row indicated in the row number area 2203 in the circuit pattern location table 2201 is stored in the circuit pattern storage area 2107. An address in the circuit pattern storage area 2107 is specified as the tail 2105 of the circuit pattern storage destination list 2101. Circuit Replacement is terminated at step 2506, and control is returned to step 2406.

In contrast, if it is judged at step 2502 that the listing order M is not larger, control is passed to step 2503. The M-th pattern storage address 2104 of a circuit pattern judged to agree with a stored one at step 2503 is deleted from the circuit pattern storage destination list 2101. At step 2504, the pattern storage addresses in the circuit pattern storage destination list 2101 starting with the first pattern storage address 2102 and ending with the M-1-th pattern storage address 2103 are shifted downwards by one row. Data specified on N rows starting with a row indicated in the row number area 2203 in the circuit pattern location table 2201 is stored in the circuit pattern storage area 2107 at step 2505. The leading address in the circuit pattern storage area 2107 is specified as the first pattern storage address 2102 in the circuit pattern storage destination list 2101. Namely, the address of a selected circuit pattern is specified at the head of the circuit pattern storage destination list 2101. Circuit Pattern Replacement therefore realizes a replacing means for placing the address of a selected circuit pattern at the head of the circuit pattern storage destination list 2101. Circuit Pattern Replacement is terminated at step 2505, and control is returned to step 2406.

Data specified on N rows starting with a row indicated in the row number area 2203 in the circuit pattern location table

2201 is stored in the retrieval character memory 1001 at step 2406. All data specified in the device number areas 1002 in the retrieval character memory 1001 is deleted at step 2407. The data stored in the character memory 1001 is displayed on the screen at step 2408. It is inquired at step 2409 whether the data is OK. If it is judged at step 2410 that OK is designated, control is passed to step 2411. After step 2411 is completed, Consistent Pattern Processing is terminated and Retrieval is terminated. If it is not judged at step 2410 that OK is not designated, control is passed to step 2412. The results of retrieval are discarded at step 2412. After step 2412 is completed, Consistent Pattern Processing is terminated and Retrieval is terminated.

The thus configured ladder circuit editing system provides the same advantages as Examples 1 and 2. In addition, a previously selected circuit pattern is automatically retrieved as a top priority, and the retrieved circuit pattern can be readily designated and utilized. Consequently, the efficiency in designing a ladder diagram can be further improved.

INDUSTRIAL APPLICABILITY

According to the present invention, a ladder circuit editing system inputs and edits a sequence program for a program controller in the form of a ladder diagram. At least one circuit pattern that has been input is stored in an unavailable area, and a new circuit pattern is stored in an available area. Circuit patterns are input successively from the unavailable area. The ladder circuit editing system comprises a circuit pattern extracting means, a display means, and a copying means. The circuit pattern extracting means compares a circuit element contained in a circuit pattern being stored in the available area with a circuit element contained in a circuit pattern stored in the unavailable area. The circuit pattern extracting means extracts a circuit pattern containing a circuit element that agrees with a stored one. The display means displays the circuit pattern extracted by the circuit pattern extracting means on the input screen. The copying means copies the circuit pattern extracted by the circuit pattern extracting means into the available area. When an operator presses the function key 0110 in the course of storing a circuit pattern in the available area, a circuit pattern containing a circuit element that agrees with a circuit element contained in the circuit pattern being stored is extracted from the unavailable area in which circuit patterns that has already been input are stored. The extracted circuit pattern is automatically displayed at a position on the input screen at which the operator has made an entry. The operator need not perform extra work but an analogous ladder diagram can be automatically retrieved. Furthermore, an unnecessarily large storage area of a memory will not be occupied, but the efficiency in designing a ladder diagram can be improved.

Moreover, the display means successively displays a plurality of circuit patterns extracted by the circuit pattern extracting means. The copying means copies any circuit pattern, which is selected based on an operator's entry from among a plurality of successively displayed circuit patterns, into the available area. Consequently, a plurality of analogous ladder diagrams is automatically retrieved. An operator selects any circuit pattern from among the circuit patterns constituting the ladder diagrams. The efficiency in designing a ladder diagram can be further improved.

Moreover, the display means displays a previously selected circuit pattern as a top priority. This contributes to further improvement of efficiency in designing a ladder diagram.

Also included are a selected circuit pattern address storage area in which the address of the previously selected circuit pattern is stored and a replacing means for placing the address of a selected circuit pattern at the head of the selected circuit pattern address storage area. The display means displays as a top priority the previously selected circuit pattern according to the order of addresses specified in the selected circuit pattern address storage area. The storage capacity of an auxiliary storage device will not be wasted but the efficiency in designing a ladder diagram can be improved.

What is claimed is:

1. A ladder circuit editing system for inputting and editing a sequence program for a program controller in the form of a ladder diagram comprising:

an unavailable area for storing a plurality of previously stored circuit patterns of circuit elements;

an available area for storing circuit elements of a circuit pattern being input;

circuit pattern extracting means for making a comparison between a circuit element stored in said available area and a corresponding circuit element contained in one of the plurality of previously stored circuit patterns stored in said unavailable area, and extracting from the plurality of previously stored circuit patterns an extracted circuit pattern in which the comparison indicates an agreement between the compared circuit elements;

display means for displaying the extracted circuit pattern on an input screen; and copying means for copying the extracted circuit pattern into said available area in response to an input by an operator.

2. A ladder circuit editing system according to claim 1, wherein:

when more than one said extracted circuit pattern is extracted, said display means successively displays, for selection by an operator, the plurality of extracted circuit patterns; and in response to the selection of one of the plurality of extracted circuit patterns, said copying means copies the selected extracted circuit pattern into said available area.

3. A ladder circuit editing system according to claim 2, wherein said display means displays a previously selected circuit pattern as a top priority.

4. A ladder circuit editing system according to claim 3, further comprising:

a selected circuit pattern address storage area storing an address of a previously selected circuit pattern; and a replacing means for placing the address of the previously selected circuit pattern at the head of said selected circuit pattern address storage area, wherein said display means displays as a top priority the previously selected circuit pattern according to an order of addresses stored in said selected circuit pattern address storage area.

5. A ladder circuit editing system for inputting and editing a sequence program for a program controller in the form of a ladder diagram comprising:

an unavailable area for storing a plurality of previously stored circuit patterns of circuit elements;

an available area for storing a circuit pattern inputted by an operator, said inputted circuit pattern comprises circuit elements;

circuit pattern extracting means for making a comparison between a circuit element of the circuit pattern stored in the available area and a corresponding circuit element contained in one of the plurality of the previously stored circuit patterns from the unavailable area, and extracting from the plurality of previously stored circuit patterns an extracted circuit pattern in which the comparison indicates an agreement between the compared circuit elements;

display means for displaying the extracted circuit pattern on a screen; and copying means for copying the extracted circuit pattern into said available area in response to another input by the operator.

6. The ladder circuit editing system according to claim 5, further comprising selecting means for receiving said another input from the operator, wherein said another input is whether the extracted circuit pattern is to be stored.

7. The ladder circuit editing system according to claim 5, wherein when the inputted circuit element of said inputted pattern is in activation division, said extracting means compares the inputted circuit element with the stored circuit elements of an activation division of one stored circuit pattern of said plurality of circuit patterns.

8. The ladder circuit editing system according to claim 7, wherein when the circuit element from the inputted circuit elements, is in an interlock division of said inputted circuit pattern, said extracting means compares the circuit element with the corresponding circuit elements being in an interlock division of one of said plurality of previously stored circuit patterns.

9. The ladder circuit editing system according to claim 8, wherein when the circuit element from the inputted circuit elements, is in an output division of said inputted circuit pattern, said extracting means compares the circuit element with the corresponding circuit elements being in an output division of one of said plurality of previously stored circuit patterns.

10. The ladder circuit editing system according to claim 6, wherein when said extracting means extracts more than one circuit patterns, said selecting means sequentially asks the operator for said another input for each of said more than one circuit patterns.

11. A method for inputting and editing a sequence program for a program controller in a form of a ladder diagram, the method comprising:

pre-storing a plurality of circuit patterns in a first storage area;

inputting a new circuit pattern;

storing the new circuit pattern in a second storage area;

comparing the stored new circuit pattern with each of said pre-stored plurality of circuit patterns;

extracting each circuit pattern from said pre-stored plurality of circuit patterns that matches the stored new circuit pattern;

displaying said each extracted circuit pattern on a screen;

selecting said each displayed circuit pattern by an operator; and copying the selected circuit pattern into said second storage area, wherein said comparison is performed by comparing each circuit element of the new circuit pattern with a corresponding circuit element from said each circuit pattern of said stored plurality of circuit patterns.

* * * * *